United States Patent
Yin et al.

(10) Patent No.: US 12,476,431 B2
(45) Date of Patent: Nov. 18, 2025

(54) BUS BAR ASSEMBLY AND FLOATING CONNECTOR THEREOF

(71) Applicant: Delta Electronics, Inc., Taoyuan (TW)

(72) Inventors: Guan-Chen Yin, Taoyuan (TW); Ching-Tang Chang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 424 days.

(21) Appl. No.: 18/112,875

(22) Filed: Feb. 22, 2023

(65) Prior Publication Data
US 2024/0154375 A1    May 9, 2024

(30) Foreign Application Priority Data

Nov. 3, 2022   (CN) .......................... 202211368933.7

(51) Int. Cl.
| | |
|---|---|
| *H01R 31/06* | (2006.01) |
| *H01R 13/10* | (2006.01) |
| *H01R 25/14* | (2006.01) |
| *H01R 25/16* | (2006.01) |

(52) U.S. Cl.
CPC ............. *H01R 31/06* (2013.01); *H01R 13/10* (2013.01); *H01R 25/162* (2013.01); *H01R 25/142* (2013.01)

(58) Field of Classification Search
CPC ...... H01R 31/06; H01R 13/10; H01R 25/162; H01R 25/142; H01R 25/145
See application file for complete search history.

(56) References Cited

U.S. PATENT DOCUMENTS

| | | |
|---|---|---|
| 3,732,523 A | 5/1973 | Fouse et al. |
| 3,956,574 A | 5/1976 | Weimer |
| D253,887 S | 1/1980 | Turner et al. |
| 4,270,019 A | 5/1981 | Thye et al. |
| 5,011,417 A | 4/1991 | Matsumoto et al. |
| 5,160,274 A | 11/1992 | Ozaki et al. |
| 5,618,186 A | 4/1997 | Saka et al. |
| 6,238,225 B1 | 5/2001 | Middlehurst et al. |
| 6,325,640 B1 | 12/2001 | Kasai |
| D463,778 S | 10/2002 | Hsu et al. |

(Continued)

FOREIGN PATENT DOCUMENTS

| | | |
|---|---|---|
| CN | 1748275 A | 3/2006 |
| CN | 111009758 B | 7/2021 |

(Continued)

*Primary Examiner* — Renee S Luebke
*Assistant Examiner* — Paul D Baillargeon
(74) *Attorney, Agent, or Firm* — KIRTON McCONKIE; Evan R. Witt

(57) ABSTRACT

The present disclosure provides a bus bar assembly and a floating connector thereof. The bus bar assembly includes a linking bus bar and a floating connector. The floating connector is configured to transmit electric power received by the linking bus bar to a rack bus bar. The linking bus bar includes an output terminal. The rack bus bar includes a connection terminal. The floating connector includes a connection module. The connection module includes a bus bar adapter and a rack adapter. The output terminal of the linking bus bar is slidably and blindly plugged into the bus bar adapter of the connection module. The rack adapter is configured for allowing the connection terminal of the rack bus bar to be slidably and blindly plugged therein.

19 Claims, 18 Drawing Sheets

(56) References Cited

U.S. PATENT DOCUMENTS

| | | |
|---|---|---|
| 6,519,817 B1 | 2/2003 | Lenhart et al. |
| 6,603,075 B1 | 8/2003 | Soares et al. |
| D582,861 S | 12/2008 | Honma et al. |
| 7,485,015 B2 | 2/2009 | Coffy |
| 7,909,663 B1 * | 3/2011 | Bouffet ............... H01R 13/18 |
| | | 439/787 |
| D640,635 S | 6/2011 | Ngo |
| 9,004,926 B2 | 4/2015 | Ozawa et al. |
| 9,166,309 B1 | 10/2015 | Costello et al. |
| D760,655 S | 7/2016 | Murphy |
| D760,656 S | 7/2016 | Murphy |
| 9,728,895 B2 | 8/2017 | Yanli et al. |
| 9,954,293 B2 | 4/2018 | Xu et al. |
| 10,361,525 B2 | 7/2019 | Li et al. |
| 10,404,041 B2 * | 9/2019 | Huang ................ H02G 5/025 |
| D867,300 S | 11/2019 | Huang |
| 10,749,301 B2 | 8/2020 | Matsui et al. |
| 10,951,013 B2 | 3/2021 | Huang |
| D1,004,555 S | 11/2023 | Chapman |
| 12,191,614 B2 * | 1/2025 | Cavallieri ............... H01R 9/26 |
| 2002/0098743 A1 | 7/2002 | Schell et al. |
| 2014/0099806 A1 | 4/2014 | Ehlen et al. |
| 2014/0370339 A1 | 12/2014 | Kim et al. |
| 2015/0214583 A1 | 7/2015 | Lim et al. |
| 2018/0048127 A1 | 2/2018 | Liang et al. |
| 2018/0076586 A1 | 3/2018 | Rangi et al. |
| 2022/0014005 A1 | 1/2022 | Luo et al. |
| 2022/0385014 A1 | 12/2022 | Hatol et al. |
| 2022/0393414 A1 | 12/2022 | Su et al. |
| 2023/0066965 A1 | 3/2023 | Yu |

FOREIGN PATENT DOCUMENTS

| | | |
|---|---|---|
| TW | M567897 U | 10/2018 |
| TW | M568539 U | 10/2018 |
| TW | D196094 S | 2/2019 |
| TW | 201913281 A | 4/2019 |
| TW | 202203525 A | 1/2022 |
| TW | 202207538 A | 2/2022 |
| TW | D221357 S | 10/2022 |

* cited by examiner

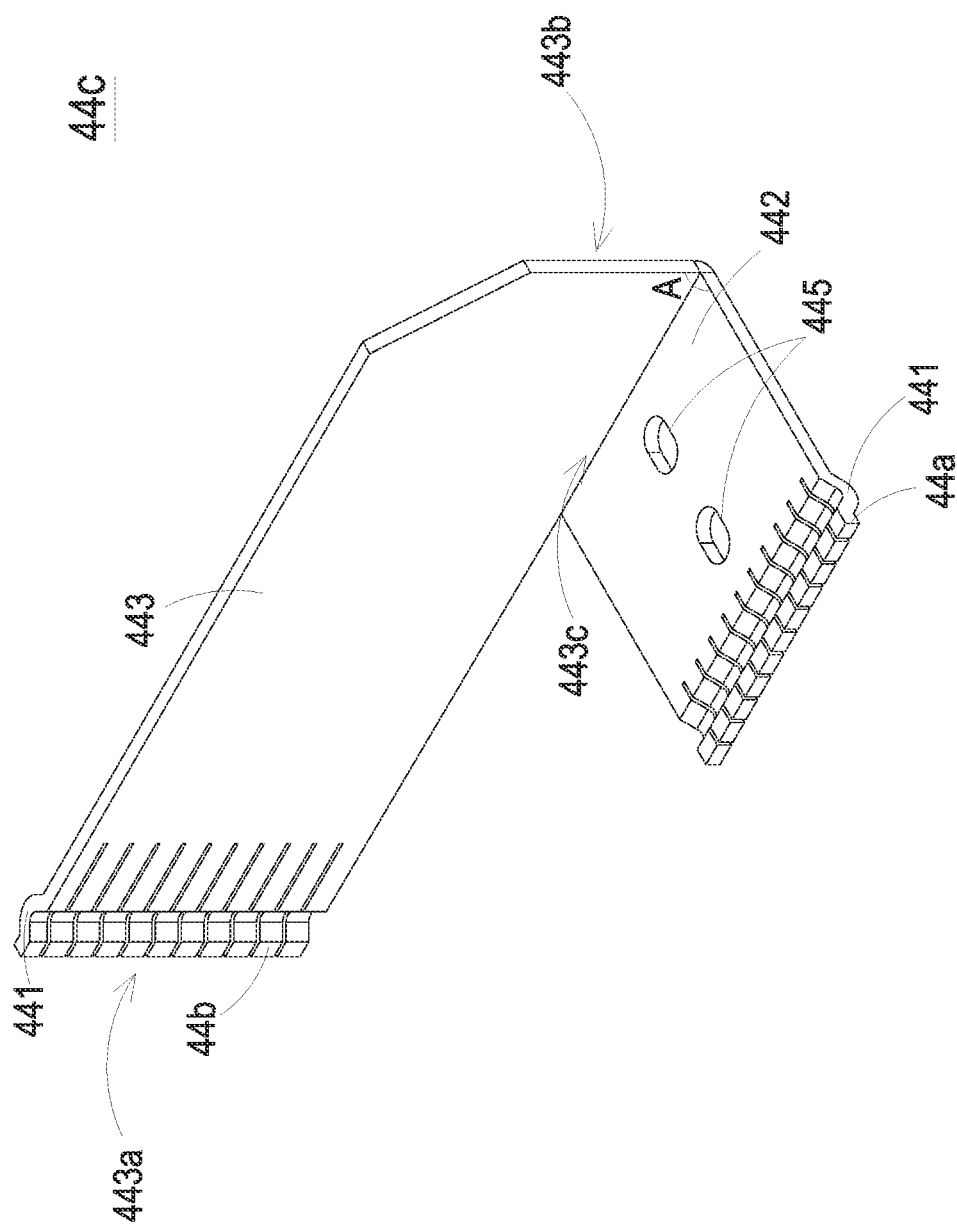

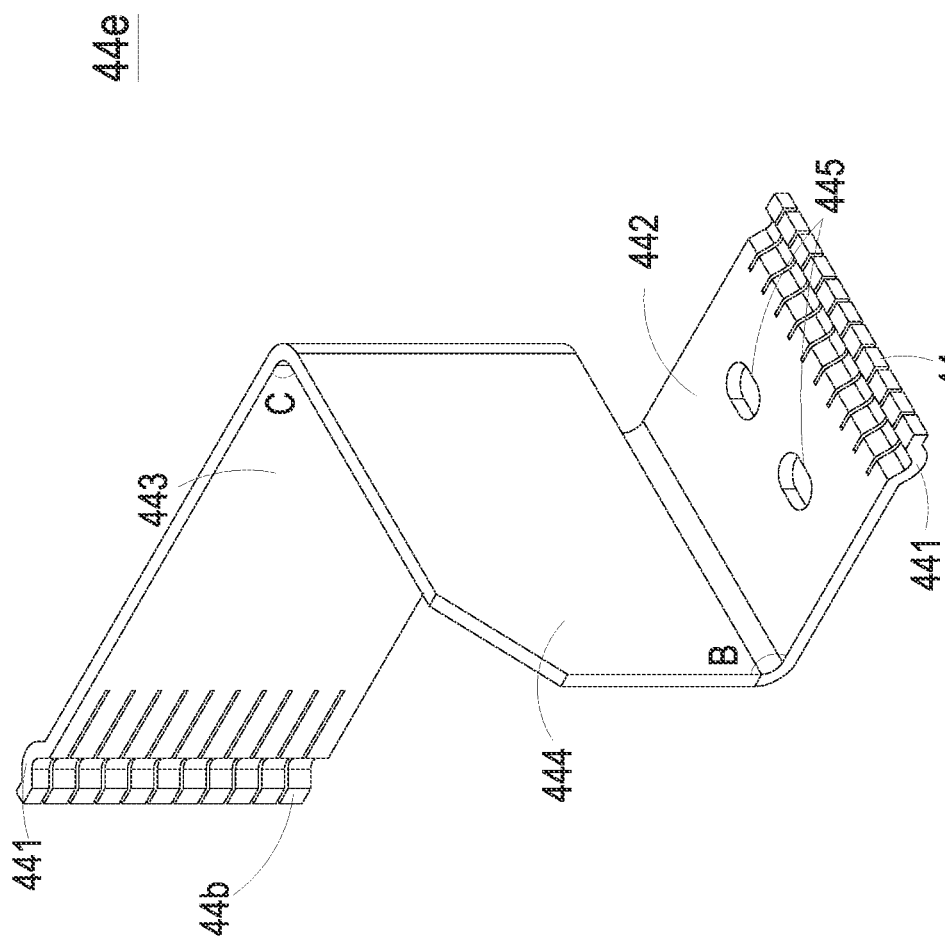

BUS BAR ASSEMBLY AND FLOATING CONNECTOR THEREOF

CROSS-REFERENCE TO RELATED APPLICATION

This application claims priority to China Patent Application No. 202211368933.7 filed on Nov. 3, 2022. The entire contents of the above-mentioned patent application are incorporated herein by reference for all purposes.

FIELD OF THE INVENTION

The present disclosure relates to a power connection element, and more particularly to a bus bar assembly and a floating connector of the bus bar assembly.

BACKGROUND OF THE INVENTION

Generally, a bus bar assembly is commonly used in a rack bus bar and configured for electrically coupling output terminals of one or a plurality of power supply units to the rack bus bar, so as to distribute power supplied by one or the plurality of power supply units to electronic equipment through the rack bus bar of the server rack. Consequently, the power for an electronic device is supplied.

FIG. 1 is a schematic perspective view illustrating a conventional bus bar assembly fixed to a rack bus bar, FIG. 2 is a cross-sectional view illustrating the conventional bus bar assembly fixed to the rack bus bar of FIG. 1. Please refer to FIGS. 1 and 2. The conventional bus bar assembly 900 includes two output terminals 901. A gap 902 is formed between the two output terminals 901. The two output terminals 901 of the bus bar assembly 900 are fixed to and electrically coupled with two connection terminals 905 of the rack bus bar 904 by a plurality of bolts 903, so that the power transmission between the bus bar assembly 900 and the rack bus bar 904 is achieved. However, the gap 902 between the two output terminals 901 of the bus bar assembly 900 has to be adjusted according to the two connection terminals 905 of the rack bus bar 904. When the gap 902 is too small, the assembly of the two output terminals 901 and the two connection terminals 905 may be unable to be performed through the bolts 903. When the gap 902 is too large, an extreme stress would be caused in the output terminals 901 of the bus bar assembly 900, and the damage to the bus bar assembly 900 may be caused.

On the other hand, a plurality of perforations (not shown) are disposed on the two output terminals 901 of the bus bar assembly 900 and the two connection terminals 905 of the rack bus bar 904, respectively. The plurality of perforations are configured for allowing the plurality of bolts 903 to penetrate and fix therethrough. However, the tolerances are formed between the plurality of perforations. When the tolerances are too large, the bolts 903 may be unable to penetrate and fix to the perforations. In addition, the bolts 903 are usually assembled manually. During the manual assembly process, the bolts 903 may be skewed, which may cause the bolt 903 to be stuck in the perforations and cannot be removed.

Therefore, there is a need of providing a bus bar assembly and a floating connector of the bus bar assembly to obviate the drawbacks encountered from the prior arts.

SUMMARY OF THE INVENTION

It is an objective of the present disclosure to provide a bus bar assembly and a floating connector thereof, which achieves the advantages of transferring the direction of connecting the bus bar assembly to the rack bus bar, reducing the stress and reducing the tolerances caused by manually assembling.

In accordance with an aspect of the present disclosure, there is provided a bus bar assembly. The bus bar assembly includes a first linking bus bar, a second linking bus bar, a plurality of power connectors and a floating connector. The first linking bus bar includes at least one first input terminal and a first output terminal. The second linking bus bar is disposed corresponding to and insulated from the first linking bus bar, and includes at least one second input terminal and a second output terminal. The plurality of power connectors are electrically coupled to the at least one first input terminal of the first linking bus bar and the at least one second input terminal of the second linking bus bar, respectively. The floating connector includes at least one first connection module and at least one second connection module. Each of the at least one first connection module and the at least one second connection module includes a bus bar adapter and a rack adapter. The first output terminal of the first linking bus bar is slidably and blindly plugged into the bus bar adapter of the at least one first connection module. The second output terminal of the second linking bus bar is slidably and blindly plugged into the bus bar adapter of the at least one second connection module. The rack adapter is configured for allowing two connection terminals of a rack bus bar to be slidably and blindly plugged therein.

In accordance with another aspect of the present disclosure, there is provided a floating connector. The floating connector is configured to transmit electric power received by at least one linking bus bar of a bus bar assembly to a rack bus bar. The at least one linking bus bar includes an output terminal. The rack bus bar includes at least one connection terminal. The floating connector includes at least one connection module. The at least one connection module is electrically coupled between the at least one linking bus bar and the rack bus bar, and includes a bus bar adapter and a rack adapter. The output terminal of the at least one linking bus bar is slidably and blindly plugged into the bus bar adapter of the at least one connection module. The rack adapter is configured for allowing the at least one connection terminal of the rack bus bar to be slidably and blindly plugged therein.

BRIEF DESCRIPTION OF THE DRAWINGS

FIG. 7A is a schematic perspective view illustrating a conductor of another embodiment of the present disclosure;

FIG. 7E is a schematic perspective view illustrating a conductor of the other embodiment of the present disclosure;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
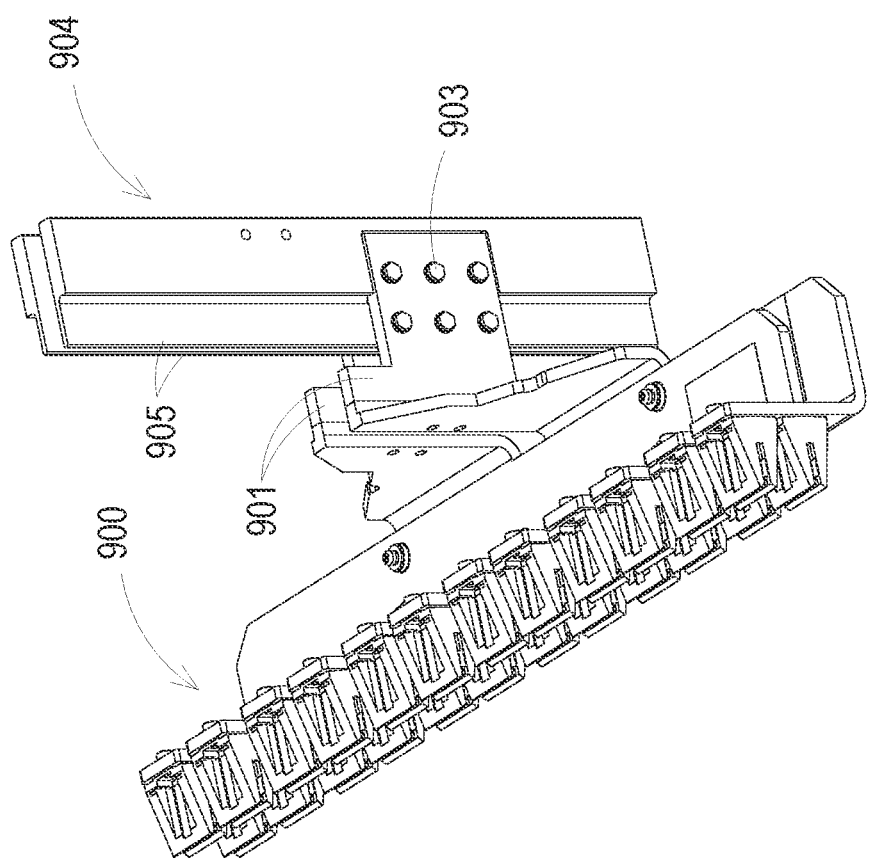
FIG. 1 is a schematic perspective view illustrating a conventional bus bar assembly fixed to a rack bus bar.
Figure 2:
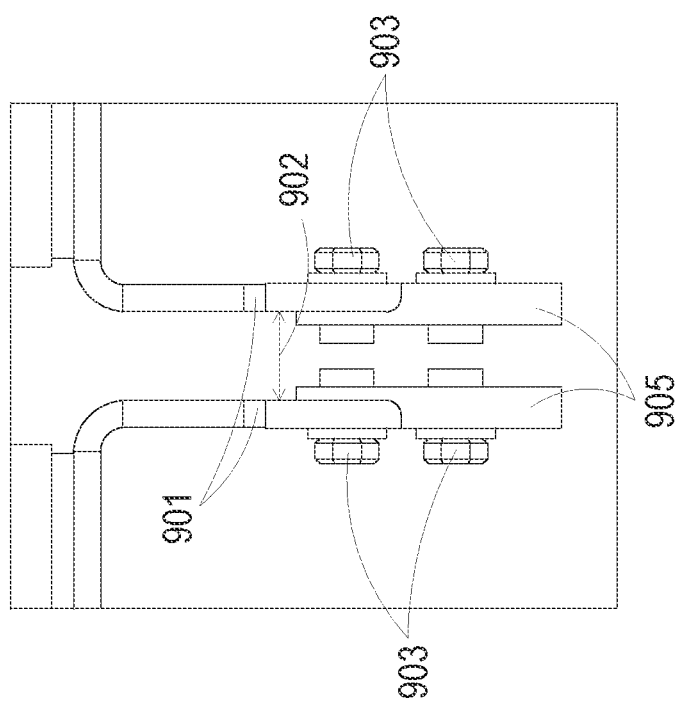
FIG. 2 is a cross-sectional view illustrating the conventional bus bar assembly fixed to the rack bus bar of FIG. 1.
Figure 3:
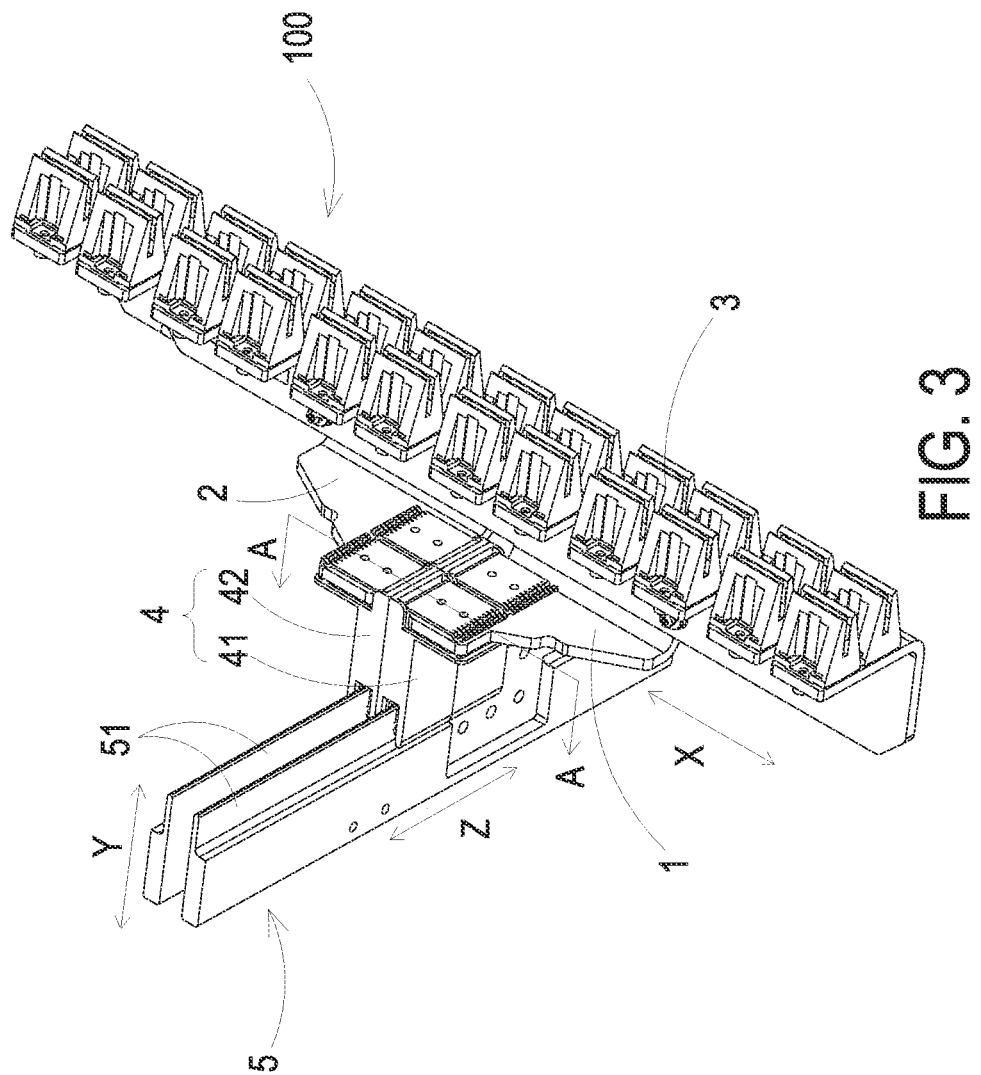
FIG. 3 is a schematic perspective view illustrating a bus bar assembly fixed to a rack bus bar of an embodiment of the present disclosure.
Figure 4:
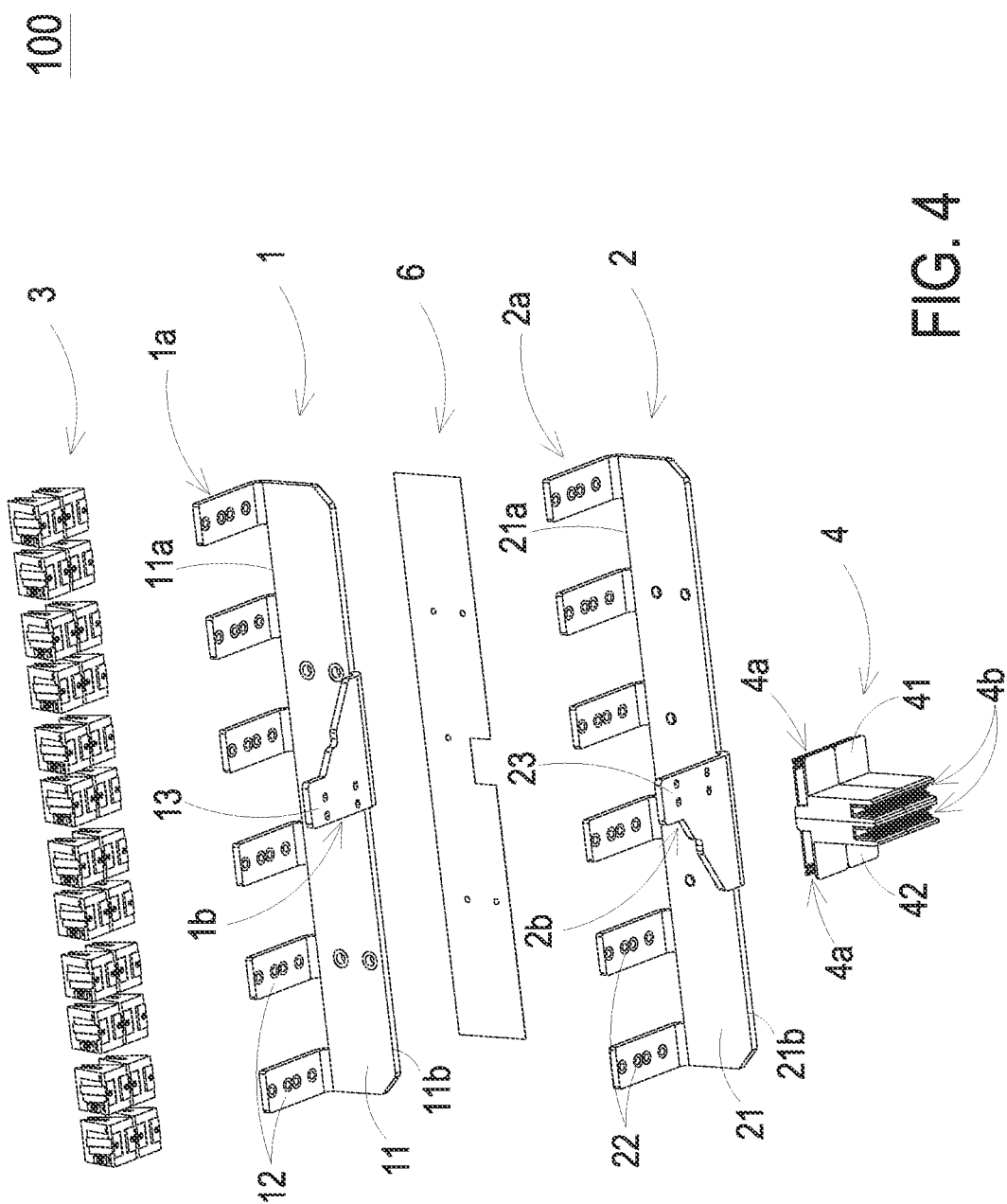
FIG. 4 is an exploded view illustrating the bus bar assembly of FIG. 3.

FIG. 3 is a schematic perspective view illustrating a bus bar assembly fixed to a rack bus bar of an embodiment of the present disclosure, and FIG. 4 is an exploded view illustrating the bus bar assembly of FIG. 3. The bus bar assembly of the present disclosure achieves the advantages of transferring the direction of connecting the bus bar assembly to the rack bus bar, reducing the stress and reducing the tolerances caused by manually assembling. In addition, the floating connector of the bus bar assembly of the present disclosure is a modular structure, which can be modified according to the required electric current. Please refer to FIGS. 3 and 4. The bus bar assembly 100 of the present embodiment is configured to transmit electric power from a power supply (not shown) to a rack bus bar 5. The bus bar assembly 100 includes a first linking bus bar 1, a second linking bus bar 2, a plurality of power connectors 3 and a floating connector 4. The first linking bus bar 1 includes a plurality of first input terminals 1a and a first output terminal 1b. The second linking bus bar 2 is disposed corresponding to and insulated from the first linking bus bar 1. The second linking bus bar 2 includes a plurality of second input terminals 2a and a second output terminal 2b. The plurality of power connectors 3 are pluggably connected to the power supplies (not shown). The plurality of power connectors 3 are electrically coupled to the first input terminals 1a of the first linking bus bar 1 and the second input terminals 2b of the second linking bus bar 2, respectively. The floating connector 4 includes at least one first connection module 41 and at least one second connection module 42. The at least one first connection module 41 is for example but not limited to disposed adjacent to the at least one second connection module 42. In the embodiment, the floating connector 4 includes two first connection modules 41 and two second connection modules 42, but not limited thereto. The two first connection modules 41 are stacked with each other, and electrically connected between the first linking bus bar 1 and the connection terminals 51 of the rack bus bar 5. Each of the first connection module 41 and the second connection module 42 includes a bus bar adapter 4a and a rack adapter 4b. The first output terminal 1b of the first linking bus bar 1 is slidably and blindly plugged into the bus bar adapters 4a of the two first connection modules 41. The second output terminal 2b of the second linking bus bar 2 is slidably and blindly plugged into the bus bar adapters 4a of the two second connection modules 42. The first linking bus bar 1 and the second linking bus bar 2 are slid along a first direction X inside the bus bar adapters 4a of the first connection modules 41 and the second connection modules 42, respectively. The first direction X is for example but not limited to parallel to a plug direction of the bus bar adapter 4a. The rack adapters 4b are configured for allowing the two connection terminals 51 of the rack bus bar 5 to be slidably and blindly plugged therein. The two connection terminals 51 of the rack bus bar 5 are disposed apart from each other. The two connection terminals 51 of the rack bus bar 5 are slid along a second direction Y or a third direction Z inside the rack adapters 4b of the first connection modules 41 and the second connection modules 42, respectively. The second direction Y is for example but not limited to parallel to a plug direction of the rack adapter 4b. The third direction Z is for example but not limited to perpendicular to a plug direction of the rack adapter 4b. In the embodiment, the first direction X, the second direction Y and the third direction Z are perpendicular to each other, but not limited thereto. By using the floating connector 4, screwless blind-mating assembly and slidably plugging in three directions are achieved, which can reduce the stress between the devices and reduce manual assembly errors.

Please refer to FIGS. 3 and 4. In the present embodiment, the first linking bus bar 1 and the second linking bus bar 2 of the bus bar assembly 100 are one-piece structures, respectively, but not limited thereto. The first linking bus bar 1 includes a first base 11, a plurality of first input connection parts 12 and a first output connection part 13. The first base 11 includes a first side 11a and a second side 11b, which are opposite to each other. The plurality of first input connection parts 12 are in connection with the first side 11a of the first base 11, respectively, and are disposed apart from each other by an interval. The plurality of first input connection parts 12 are disposed perpendicular to the first base 11. The first output connection part 13 is in connection with the second side 11b of the first base 11, and is perpendicular to the first base 11. Each of the plurality of first input terminals 1a is one of the terminals of the first input connection parts 12. Each of the plurality of first input terminals 1a is in connection with corresponding one of the plurality of power connectors 3. The first output terminal 1b is the terminal of the first output connection part 13, and configured to be slidably and blindly plugged into and electrically coupled with the bus bar adapters 4a of the first connection modules 41 of the floating connector 4.

Please refer to FIGS. 3 and 4. In the present embodiment, the second linking bus bar 2 of the bus bar assembly 100 includes a second base 21, a plurality of second input connection parts 22 and a second output connection part 23. The second base 21 includes a first side 21a and a second side 21b, which are opposite to each other. The plurality of second input connection parts 22 are in connection with the first side 21a of the second base 21, respectively, and are disposed apart from each other by an interval. The plurality of second input connection parts 22 are disposed perpendicular to the second base 21. The second output connection part 23 is in connection with the second side 21b of the second base 21, and is perpendicular to the second base 21. Each of the plurality of second input terminals 2a is one of the terminals of the second input connection parts 22. Each of the plurality of second input terminals 2a is in connection with corresponding one of the plurality of power connectors 3. The second output terminal 2b is the terminal of the second output connection part 23, and configured to be slidably and blindly plugged into and electrically coupled with the bus bar adapters 4a of the second connection modules 42 of the floating connector 4.

Please refer to FIGS. 3 and 4. In the present embodiment, the bus bar assembly 100 includes an insulation element 6. The insulation element 6 is disposed between the first linking bus bar 1 and the second linking bus bar 2, and configured to insulate the first linking bus bar 1 and the second linking bus bar 2 from each other. Preferably, the insulation element 6 is disposed between the first base 11 of the first linking bus bar 1 and the second base 21 of the second linking bus bar 2. The insulation element 6 is for example but not limited to a gasket made by an insulation material.

Figure 5:
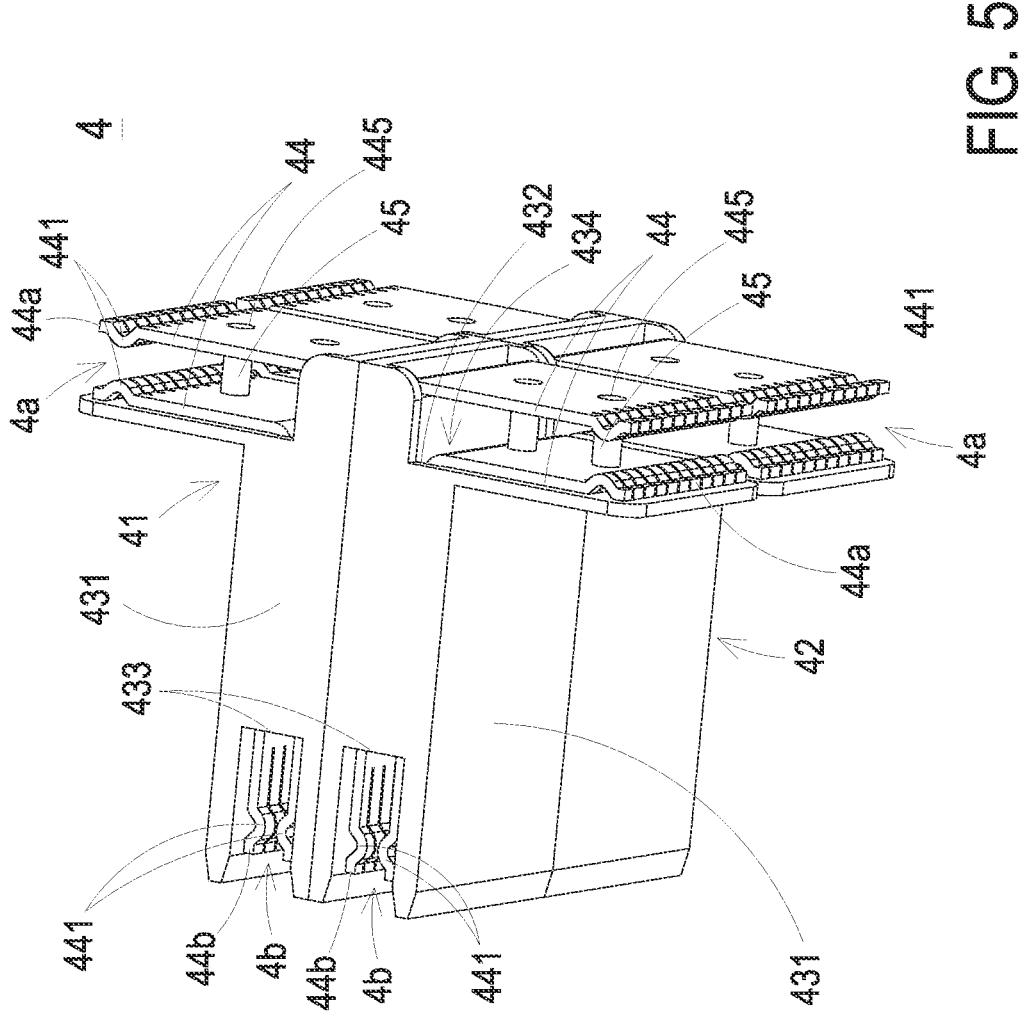
FIG. 5 is a schematic perspective view illustrating a floating connector of the bus bar assembly of FIG. 3.
Figure 6A:
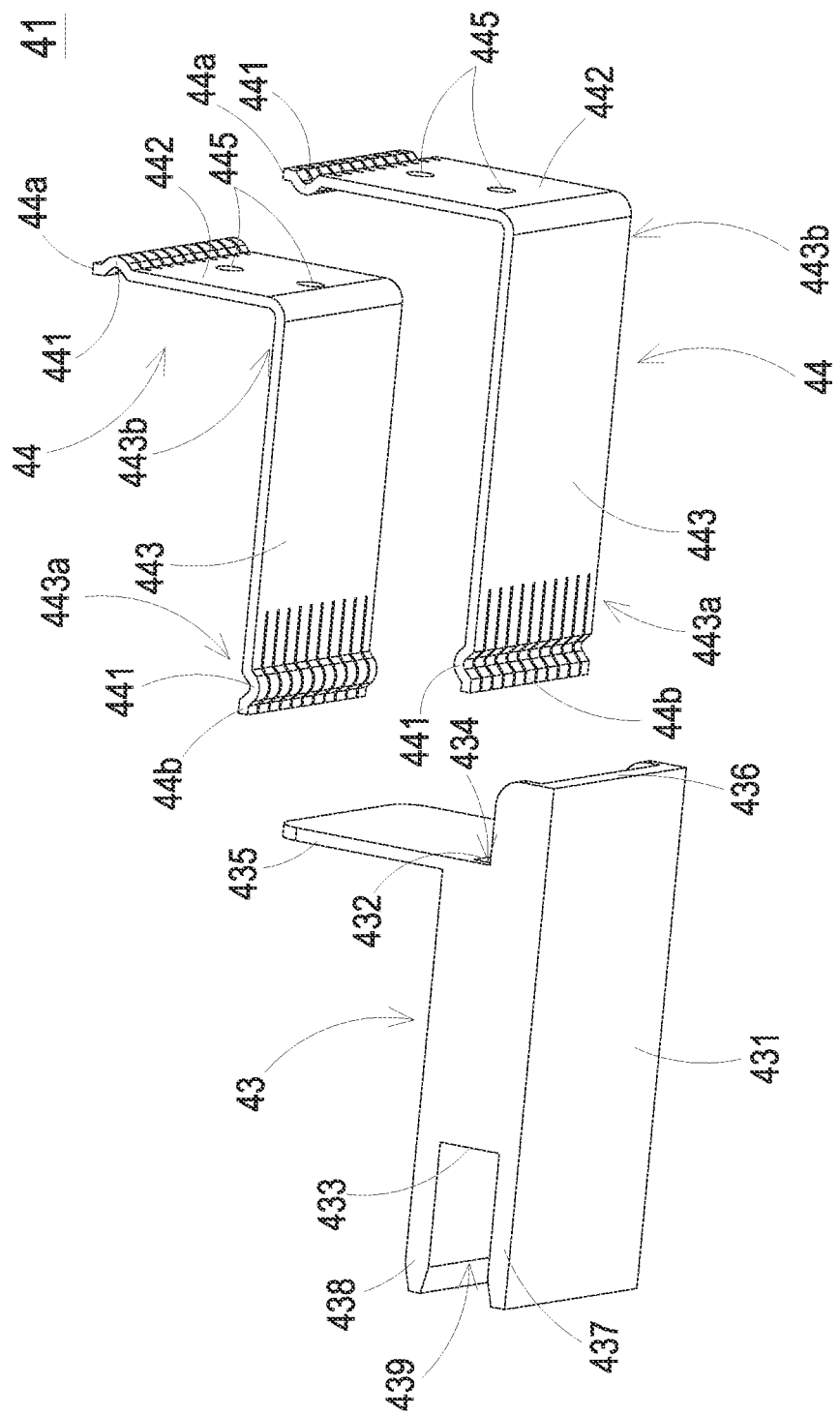
FIG. 6A is an exploded view illustrating a first connection module of the floating connector of FIG. 5.
Figure 6B:
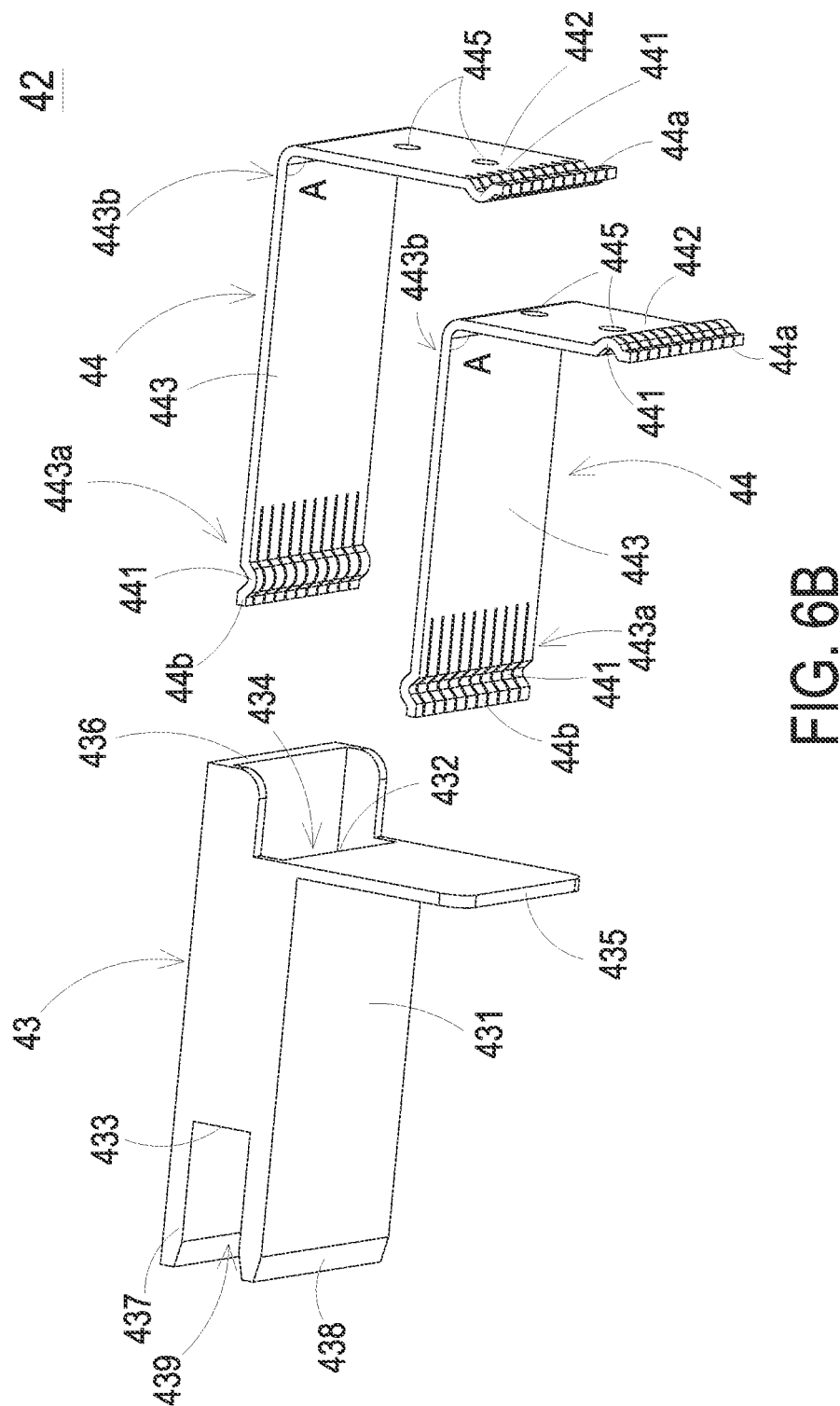
FIG. 6B is an exploded view illustrating a second connection module of the floating connector of FIG. 5.

FIG. 5 is a schematic perspective view illustrating a floating connector of the bus bar assembly of FIG. 3, FIG. 6A is an exploded view illustrating a first connection module of the floating connector of FIG. 5, and FIG. 6B is an exploded view illustrating a second connection module of the floating connector of FIG. 5. Please refer to FIGS. 5, 6A and 6B. In the present embodiment, the first connection module 41 and the second connection module 42 of the floating connector 4 include a housing 43 and at least one conductor 44, respectively. The housing 43 of the first connection module 41 and the housing 43 of the second connection module 42 are same structures. The housing 43 includes a main body 431, a bus bar opening 432, a rack opening 433 and a channel 434. The channel 434 is in communication between the bus bar opening 432 and the rack opening 433, and runs through the main body 431. In an embodiment, the first connection module 41 and the second connection module 42 include two conductors 44, respectively, but not limited thereto. The two conductors 44 are disposed apart from each other. At least a part of the conductor 44 is accommodated in the channel 434 of the housing 43. Since the housing 43 surrounds at least a part of the conductor 44, the functions of position limiting, insulation and protection are achieved. Each of the two conductors 44 includes a first end 44a and a second end 44b. The two first ends 44a of the two conductors 44 are disposed corresponding to the bus bar opening 432, so as to form the bus bar adapter 4a. The two second ends 44b of the two conductors 44 are disposed corresponding to the rack opening 433, so as to form the rack adapter 4b. When the first output terminal 1b of the first linking bus bar 1 is blindly plugged into the bus bar adapter 4a of the first connection module 41, the first output terminal 1b is clipped between the two first ends 44a of the two conductors 44, which can slide along the first direction X. Meanwhile, the conductors 44 are electrically coupled with the first output terminal 1b.

When the second output terminal 2b of the second linking bus bar 2 is blindly plugged into the bus bar adapter 4a of the second connection module 42, the second output terminal 2b is clipped between the two first ends 44a of the two conductors 44, which can slide along the first direction X. Meanwhile, the conductors 44 is electrically coupled with the second output terminal 2b. When the two connection terminals 51 of the rack bus bar 5 are blindly plugged into the rack adapters 4b of the first connection module 41 and the second connection module 42, respectively, each of the two connection terminals 51 of the rack bus bar 5 is clipped between the two second ends 44b of the conductors 44, which can slide along the second direction Y or the third direction Z. Meanwhile, the conductors 44 are electrically coupled with the corresponding connection terminal 51 of the rack bus bar 5. Since the first linking bus bar 1 and the second linking bus bar 2 are slidably plugged into the bus bar adapters 4a of the first connection modules 41 and the second connection modules 42 and the rack bus bar 5 is slidably plugged into the rack adapters 4b of the first connection modules 41 and the second connection modules 42, the advantages of blind-mating assembly without screws, reducing the stress between the devices and reducing the manual assembly errors are achieved.

Figure 9:
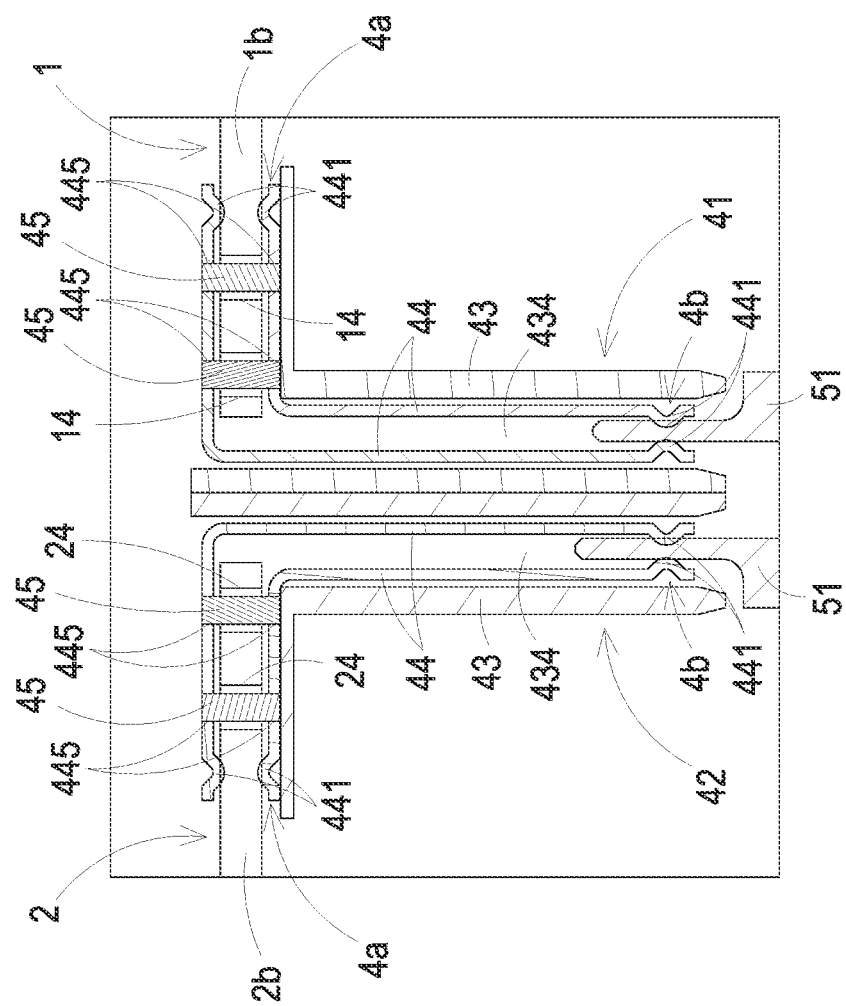
FIG. 9 is a partially enlarged cross-sectional view illustrating the bus bar assembly fixed to a rack bus bar of FIG. 3 and taken along the line A-A.

Please refer to FIGS. 5, 6A and 6B. In the present embodiment, the first end 44a and the second end 44b of any one of the conductors 44 of the first connection module 41 and the second connection module 42 have a protrusion 441, respectively. Each of the protrusions 441 is formed on the conductor 44 and protruded from the conductor 44 toward another conductor 44. When the first output terminal 1b of the first linking bus bar 1 is blindly plugged into the bus bar adapter 4a of the floating connector 4 (as shown in FIG. 9), the protrusions 441 of the first ends 44a of the two conductors 44 of the first connection module 41 contact against the first output terminal 1b, so that the first output terminal 1b is clipped between and in contact with the two protrusions 441 of the conductors 44 of the first connection module 41. When the second output terminal 2b of the second linking bus bar 2 is blindly plugged into the bus bar adapter 4a of the second connection module 42 (as shown in FIG. 9), the protrusions 441 of the first ends 44a of the two conductors 44 of the second connection module 42 contact against the second output terminal 2b, so that the second output terminal 2b is clipped between and in contact with the two protrusions 441 of the conductors 44 of the second connection module 42. When the two connection terminals 51 of the rack bus bar 5 are blindly plugged into the rack adapters 4b of the first connection module 41 and the second connection module 42, respectively (as shown in FIG. 9), the protrusions 441 of the second ends 44b of the two conductors 44 of the first connection module 41 and the second connection module 42 contact against the two connection terminals 51 of the rack bus bar 5, respectively, so that the two connection terminals 51 are clipped between and in contact with the two protrusions 441 of the conductors 44 of the first connection module 41 and the second connection module 42, respectively. Since the protrusions 441 of the conductors 44 clip the first output terminal 1b, the second output terminal 2b and the two connection terminals 51 of the rack bus bar 5, the risk of detaching the first output terminal 1b, the second output terminal 2b and the rack bus bar 5 from the bus bar adapters 4a and the rack adapters 4b is prevented.

Please refer to FIGS. 5, 6A and 6B. In the present disclosure, the conductor 44 includes a first segment 442 and a second segment 443. The first segment 442 is in connection with the second segment 443. The second segment 443 includes a first side 443a and a second side 443b. The first side 443a and the second side 443b are two opposite sides of the second segment 443. The protrusion 441 is disposed adjacent to the first side 443a of the second segment 443. The first segment 442 is in connection with the second side 443b of the second segment 443. The first segment 442 is bent from the second side 443b of the second segment 443 by a first angle A. In an embodiment, the first angle A is for example but not limited to 90 degrees. The first end 44a of the conductor 44 is a free end of the first segment 442. The first segment 442 is disposed outside the bus bar opening 432 of the housing 43. The extension direction of a plane where the first segment 442 is located is parallel to the extension direction of a plane where the bus bar opening 432 is located. The second end 44b of the conductor 44 is a free end of the second segment 443. The second end 44b is protruded outside the channel 434 from the rack opening 433 of the housing 43. Since the first segment 442 of the conductor 44 is bent from the second side 443b of the second segment 443 by the first angle A, the plug direction of the bus bar adapter 4a and the plug direction of the rack adapter 4b are non-coplanar. Therefore, the advantage of transferring the direction of connecting the first linking bus bar 1 and the second linking bus bar 2 to the rack bus bar 5 is achieved.

FIG. 7A is a schematic perspective view illustrating a conductor of another embodiment of the present disclosure. Please refer to FIG. 7A. In the present disclosure, the conductor 44c includes a first segment 442 and a second segment 443. The second segment 443 includes a first side 443a, a second side 443b and a third side 443c. The first side 443a and the second side 443b are two opposite sides of the second segment 443. The third side 443c is disposed between the first side 443a and the second side 443b. The protrusion 441 is disposed adjacent to the first side 443a of the second segment 443. The first segment 442 is in connection with the third side 443c of the second segment 443. The first segment 442 is bent form the third side 443c of the second segment 443 by a first angle A. In an embodiment, the first angle A is for example but not limited to 90 degrees. The first end 44a of the conductor 44c is a free end of the first segment 442. The second end 44b of the conductor 44c is a free end of the second segment 443. Since the first segment 442 of the conductor 44 is bent from the third side 443c of the second segment 443 by the first angle A, the plug direction of the bus bar adapter 4a and the plug direction of the rack adapter 4b are non-coplanar. Therefore, the advantage of transferring the direction of connecting the first linking bus bar 1 and the second linking bus bar 2 to the rack bus bar 5 is achieved. In this embodiment, a housing (not shown) surrounds at least a part of the conductor 44c, but not limited thereto.

Figure 7B:
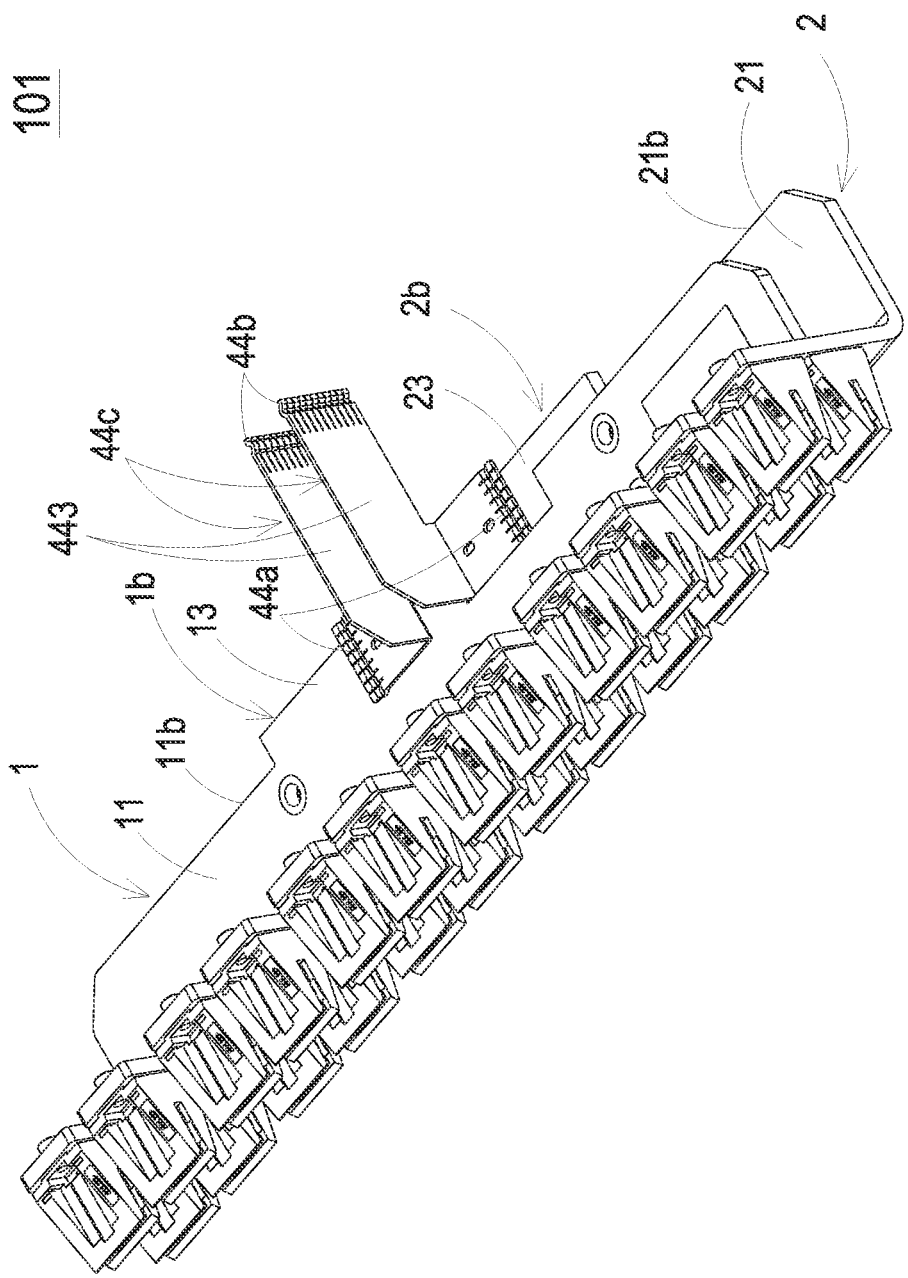
FIG. 7B is a schematic perspective view illustrating the conductor of FIG. 7A connecting to the first linking bus bar and the second linking bus bar, wherein the housing of the floating connector is omitted.

FIG. 7B is a schematic perspective view illustrating the conductor of FIG. 7A connecting to the first linking bus bar and the second linking bus bar, wherein the housing of the floating connector is omitted. Please refer to FIGS. 7A and 7B. The bus bar assembly 101 of the present embodiment is similar to the bus bar assembly 100 shown in FIGS. 3 and 4, the same symbols represent the same components and functions, and would not be repeatedly described hereinafter. Different from the bus bar assembly 100 shown in FIGS. 3 and 4, the first output connection part 13 of the first linking bus bar 1 of the bus bar assembly 101 of the present embodiment is in connection with the second side 11b of the first base 11, and is extended parallel to the first base 11. The first output terminal 1b is the terminal of the first output connection part 13. The second output connection part 23 of the second linking bus bar 2 of the bus bar assembly 101 is in connection with the second side 21b of the second base 21, and is extended parallel to the second base 21. The second output terminal 2b is the terminal of the second output connection part 23. The two conductors 44c are disposed symmetrically to each other. The first ends 44a of the two conductors 44c are configured for forming two bus bar adapters 4a, respectively. The first ends 44a of the two conductors 44c are electrically coupled to the first output terminal 1b of the first linking bus bar 1 and the second output terminal 2b of the second linking bus bar 2, respectively. In the present embodiment, the second segments 443 of the two conductors 44c have different heights for corresponding the height difference of the first linking bus bar 1 and the second linking bus bar 2, but not limited thereto. The second ends 44b of the two conductors 44c are configured for forming two rack adapters 4b. Since the first segment 442 of conductor 44c is bent from the third side 443c of the second segment 443 by the first angle A, the plug direction of the rack adapter 4b is toward the specific direction for receiving the connection terminal 51 of the rack bus bar 5. Therefore, the advantage of transferring the direction of connecting the first linking bus bar 1 and the second linking bus bar 2 to the rack bus bar 5 is achieved.

Figure 7C:
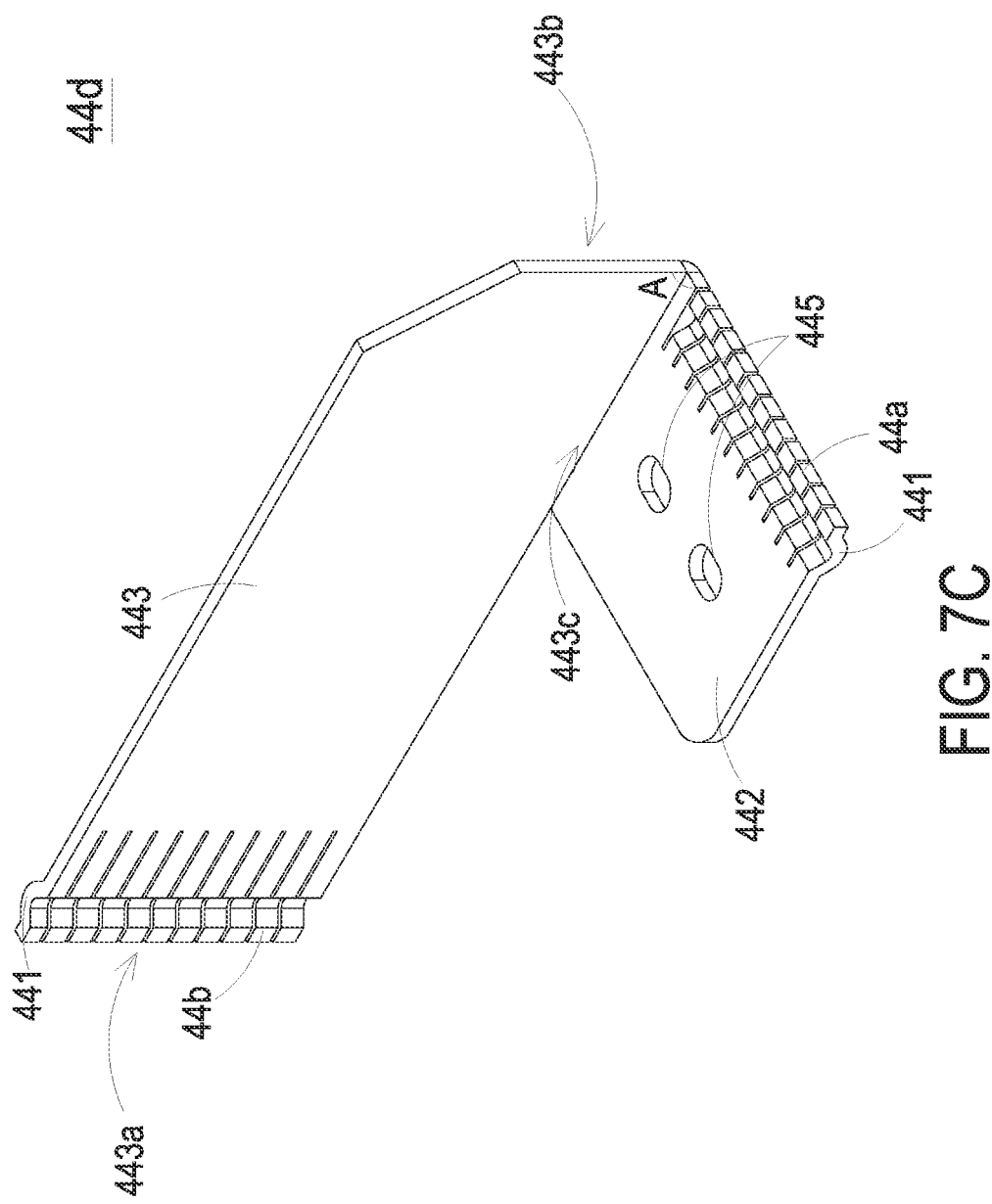
FIG. 7C is a schematic perspective view illustrating a conductor of the other embodiment of the present disclosure.
Figure 7D:
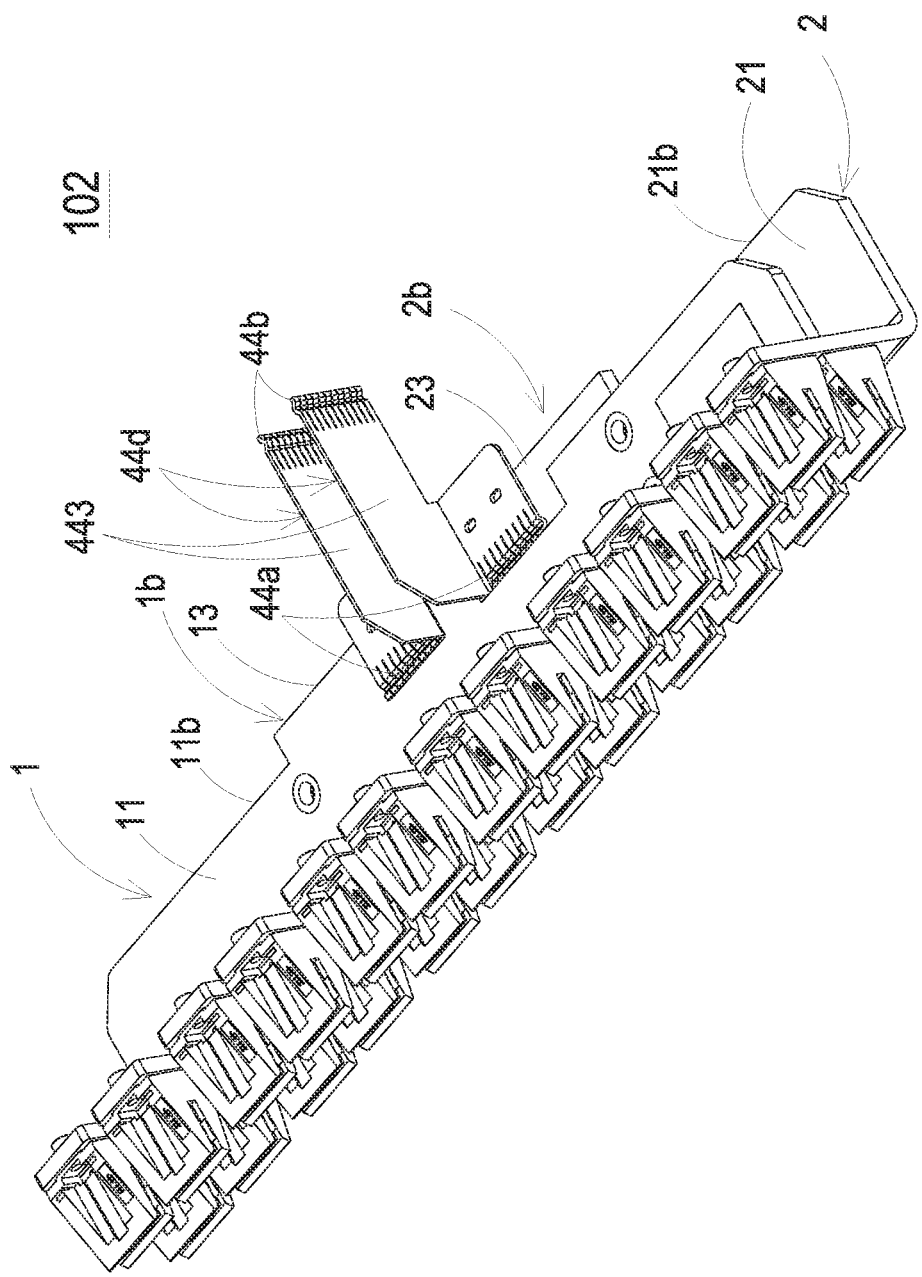
FIG. 7D is a schematic perspective view illustrating the conductor of FIG. 7C connecting to the first linking bus bar and the second linking bus bar, wherein the housing of the floating connector is omitted.

FIG. 7C is a schematic perspective view illustrating a conductor of the other embodiment of the present disclosure, and FIG. 7D is a schematic perspective view illustrating the conductor of FIG. 7C connecting to the first linking bus bar and the second linking bus bar, wherein the housing of the floating connector is omitted. Please refer to FIGS. 7C and 7D. The bus bar assembly 102 of the present embodiment is similar to the bus bar assembly 101 shown in FIGS. 7A and 7B, the same symbols represent the same components and functions, and would not be repeatedly described hereinafter. Different from the bus bar assembly 101 shown in FIGS. 7A and 7B, the conductor 44d of the present embodiment includes a first segment 442 and a second segment 443. The second segment 443 has a first side 443a, a second side 443b and a third side 443c. The first side 443a and the second side 443b are two opposite sides of the second segment 443. The third side 443c is disposed between the first side 443a and the second side 443b. The protrusion 441 is disposed adjacent to the first side 443a of the second segment 443. The first segment 442 is in connection with the third side 443c of the second segment 443. The first segment 442 is bent from the third side 443c of the second segment 443 by a first angle A. In an embodiment, the first angle A is for example but not limited to 90 degrees. The first end 44a of the conductor 44d is a side of the first segment 442. The side of first segment 442 is disposed adjacent to the second side 443b of the second segment 443. The second end 44b of the conductor 44d is a free end of the second segment 443. Since the first segment 442 of conductor 44d is bent from the third side 443c of the second segment 443 by the first angle A and the first end 44a is the side of the first segment 442, the plug direction of the bus bar adapter 4a and the plug direction of the rack adapter 4b are non-coplanar. Therefore, the advantage of transferring the direction of connecting the first linking bus bar 1 and the second linking bus bar 2 to the rack bus bar 5 is achieved. In the present embodiment, a housing (not shown) surrounds at least a part of the conductor 44c, but not limited thereto. In the present embodiment, the second segments 443 of the two conductors 44d have different heights for corresponding the height difference of the first linking bus bar 1 and the second linking bus bar 2, but not limited thereto.

Figure 7F:
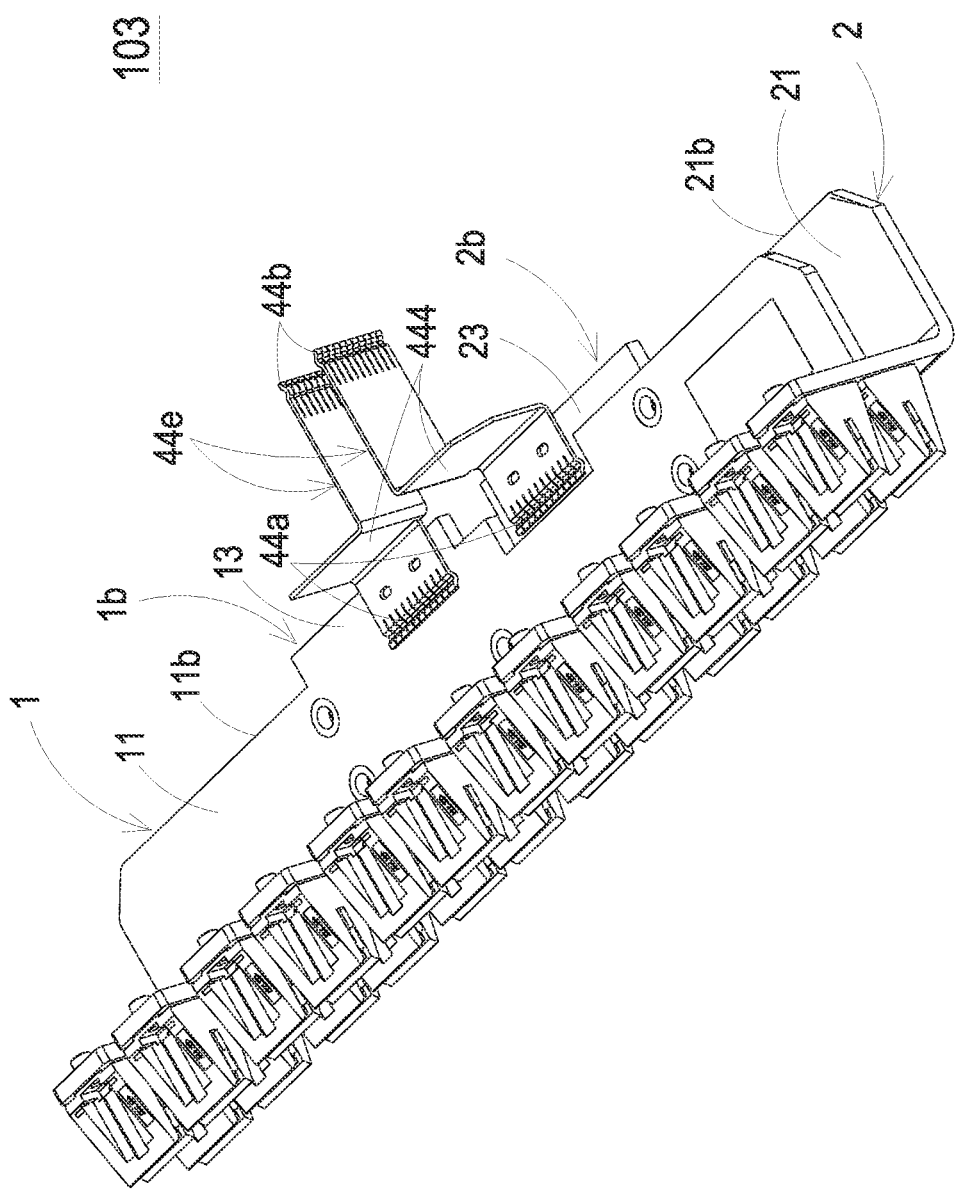
FIG. 7F is a schematic perspective view illustrating the conductor of FIG. 7E connecting to the first linking bus bar and the second linking bus bar, wherein the housing of the floating connector is omitted.

FIG. 7E is a schematic perspective view illustrating a conductor of the other embodiment of the present disclosure, and FIG. 7F is a schematic perspective view illustrating the conductor of FIG. 7E connecting to the first linking bus bar and the second linking bus bar, wherein the housing of the floating connector is omitted. Please refer to FIGS. 7E and 7F. The bus bar assembly 103 of the present embodiment is similar to the bus bar assembly 101 shown in FIGS. 7A and 7B, the same symbols represent the same components and functions, and would not be repeatedly described hereinafter. The conductor 44e of the present embodiment includes a first segment 442, a second segment 443 and a third segment 444. The first segment 442 and the second segment 443 are in connection with the two adjacent sides of the third segment 444. The first segment 442 is bent from a side of the third segment 444 by a second angle B. The second segment 443 is bent from another side of the third segment 444 by a third angle C. The first end 44a of the conductor 44e is a free end of the first segment 442. The second end 44b of the conductor 44e is a free end of the second segment 443. Since the first segment 442 is bent from the side of the third segment 444 by the second angle B and the second segment 443 is bent from another side of the third segment 444 by the third angle C, the plug direction of the bus bar adapter 4a and the plug direction of the rack adapter 4b are non-coplanar. Therefore, the advantage of transferring the direction of connecting the first linking bus bar 1 and the second linking bus bar 2 to the rack bus bar 5 is achieved. In an embodiment, the second angle B and the third angle C are for example but not limited to 90 degrees, respectively. The first segment 442 and the second segment 443 are bent from different side of the third segment 444, and the first segment 442 and the second segment 443 are non-coplanar. In the present embodiment, a housing (not shown) surrounds at least a part of the conductor 44e, but not limited thereto. In the present embodiment, the second segments 443 of the two conductors 44e have different heights for corresponding the height difference of the first linking bus bar 1 and the second linking bus bar 2, but not limited thereto.

Figure 8:
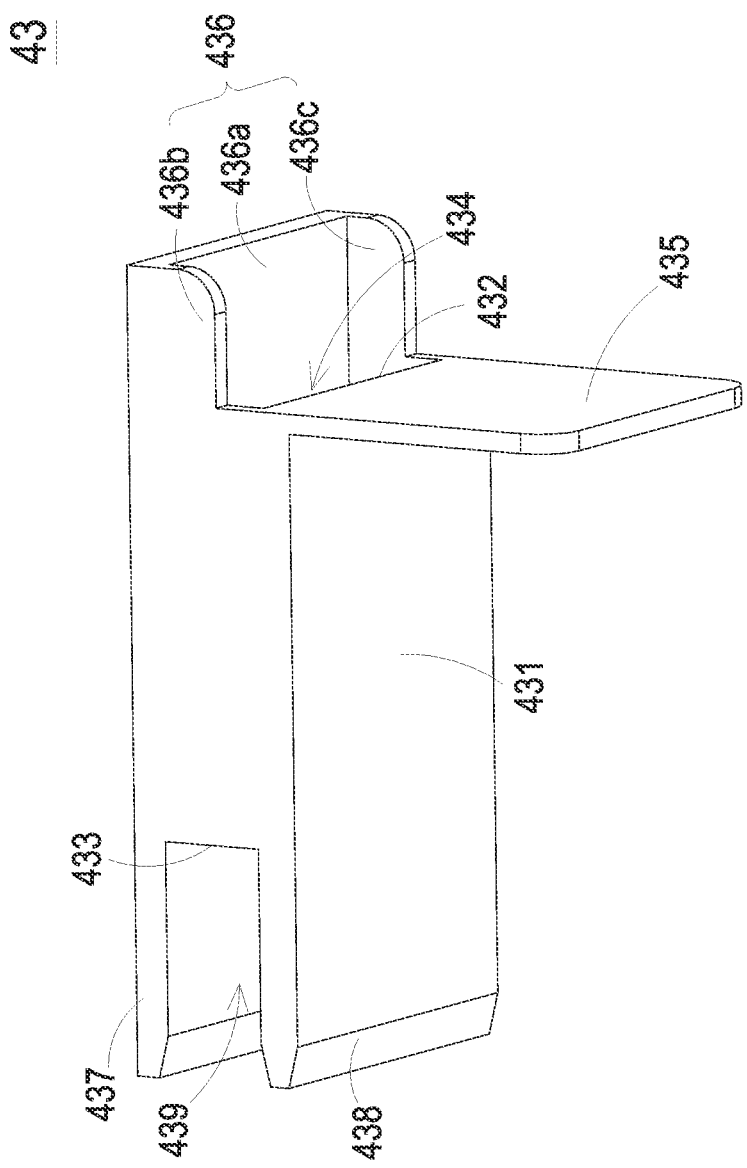
FIG. 8 is a schematic perspective view illustrating the housing of the floating connector of FIG. 5.

FIG. 8 is a schematic perspective view illustrating the housing of the floating connector of FIG. 5. Please refer to FIGS. 5, 6A, 6B and 8. In the present disclosure, the housing 43 includes a first extension part 435. The first extension part 435 is extended from the main body 431 toward a planar extension direction where the bus bar opening 432 is located. The first extension part 435 is disposed corresponding to the first segment 442 of the conductor 44. Due to the first extension part 435, the first segment 442 of the conductor 44 is prevented from being excessively deformed or broken during the assembly process.

Please refer to FIGS. 5, 6A, 6B and 8. In the present disclosure, the housing 43 includes a second extension part 436. The second extension part 436 is extended from the bus bar opening 432 toward an extended direction perpendicular to a plane where the bus bar opening 432 is located. The first extension part 435 and the second extension part 436 are disposed on two opposite sides of the bus bar opening 432, and are spaced apart from each other by an interval. The second extension part 436 has a first part 436a, a second part 436b and a third part 436c. The first part 436a, the second part 436b and the third part 436c are in connection with the main body 431, and are in connection adjacent to each other. The second part 436b and the third part 436c are in connection with two opposite sides of the first part 436a, respectively. The second extension part 436 is disposed corresponding to a part of the second segment 443 of the conductor 44 and the bent portion of the second segment 443 and the first segment 442, and configured to prevent the deformation of the conductor 44. Due to the second extension part 436, the second segment 443 of the conductor 44 is prevented from being excessively deformed or broken during the assembly process.

Please refer to FIGS. 5, 6A, 6B and 8. In the present disclosure, the housing 43 includes a third extension part 437 and a fourth extension part 438. The third extension part 437 and the fourth extension part 438 are disposed on two opposite sides of the rack opening 433, are extended from the main body 431 toward a direction away from the rack opening 433, respectively, and are corresponding to each other. A notch 439 is formed between the third extension part 437 and the fourth extension part 438. The second end 44b of the conductor 44 is disposed in the notch 439. The third extension part 437 and the fourth extension part 438 are configured to limit the deformation of the second end 44b of the conductor 44, so as to prevent the second end 44b of the conductor 44 from being excessively deformed or broken during the assembly process. In addition, the notch 439 limits the sliding directions of the connection terminal 51 of the rack bus bar 5, so as to prevent the rack bus bar 5 from detachment. In an embodiment, the profile of the housing 43 is not limited to the above-mentioned embodiments and can be adjusted according to the profile of the conductor 44.

In an embodiment, the housing 43 includes a plurality of heat dissipation openings (not shown). The plurality of heat dissipation openings run through the main body 431, and are in communication between the channel 434 and the outside of the housing 43, so that the heat exchange is formed between the channel 434 and the outside of the main body 431. Consequently, the advantage of enhancing heat dissipation is achieved.

The first connection module 41 and the second connection module 42 are for example but not limited to modular structures, respectively. For example, the floating connector 4 of the present embodiment includes two first connection modules 41 and two second connection modules 42, which are used to transmit current with higher ampere, for example but not limited to 2400 ampere. In an embodiment, the floating connector 4 includes one first connection module 41 and one second connection module 42, which are used to transmit current with lower ampere, for example but not limited to 1200 ampere. The numbers of the first connection module 41 and the second connection module 42 of the floating connector 4 are not limited to the above-mentioned embodiments and can be adjusted according to the practical requirements.

FIG. 9 is a partially enlarged cross-sectional view illustrating the bus bar assembly fixed to a rack bus bar of FIG. 3 and taken along the line A-A. Please refer to FIGS. 5, 6A, 6B and 9. In the present embodiment, each of the first connection module 41 and the second connection module 42 of the floating connector 4 includes at least one limiting element 45. The two conductors 44 of each of the first connection module 41 and the second connection module 42 include at least one first limiting opening 445, respectively. The at least one first limiting opening 445 runs through the first segment 442 of the conductor 44. The first output terminal 1b of the first linking bus bar 1 has at least one second limiting opening 14. The second output terminal 2b of the second linking bus bar 2 has at least one second limiting opening 24. In the present embodiment, each of the first connection module 41 and the second connection module 42 includes two limiting elements 45. The first linking bus bar 1 includes two second limiting openings 14, and the second linking bus bar 2 includes two second limiting openings 24, but not limited thereto. Each of the limiting elements 45 penetrates through the corresponding one of the first limiting openings 445 of the two conductors 44, and penetrates through the corresponding one of the second limiting openings 14 of the first output terminal 1b or the second limiting openings 24 of the second output terminal 2b.

In the present embodiment, the limiting element 45 is fixedly mounted in the first limiting openings 445 of the two conductors 44. The areas of the second limiting opening 14 of the first linking bus bar 1 and the second limiting opening 24 of the second linking bus bar 2 are greater than the cross-sectional area of the limiting element 45, respectively, so that the limiting element 45 is movably disposed in the second limiting opening 14 of the first linking bus bar 1 and the second limiting opening 24 of the second linking bus bar 2. In an embodiment, the cross-sectional area of the limiting element 45 is for example but not limited to circle. The areas of the first limiting openings 445 of the two conductors 44 are matched with the area of the limiting element 45, respectively. Preferably, the limiting element 45 is tightly fitted to the first limiting openings 445 of the two conductors 44. Preferably, the limiting element 45 is a bolt, a screw or other round bar-shaped fixing element, but not limited thereto. In an embodiment, the second limiting openings 14 and the second limiting openings 24 are for example but not limited to oval perforations.

Figure 10:
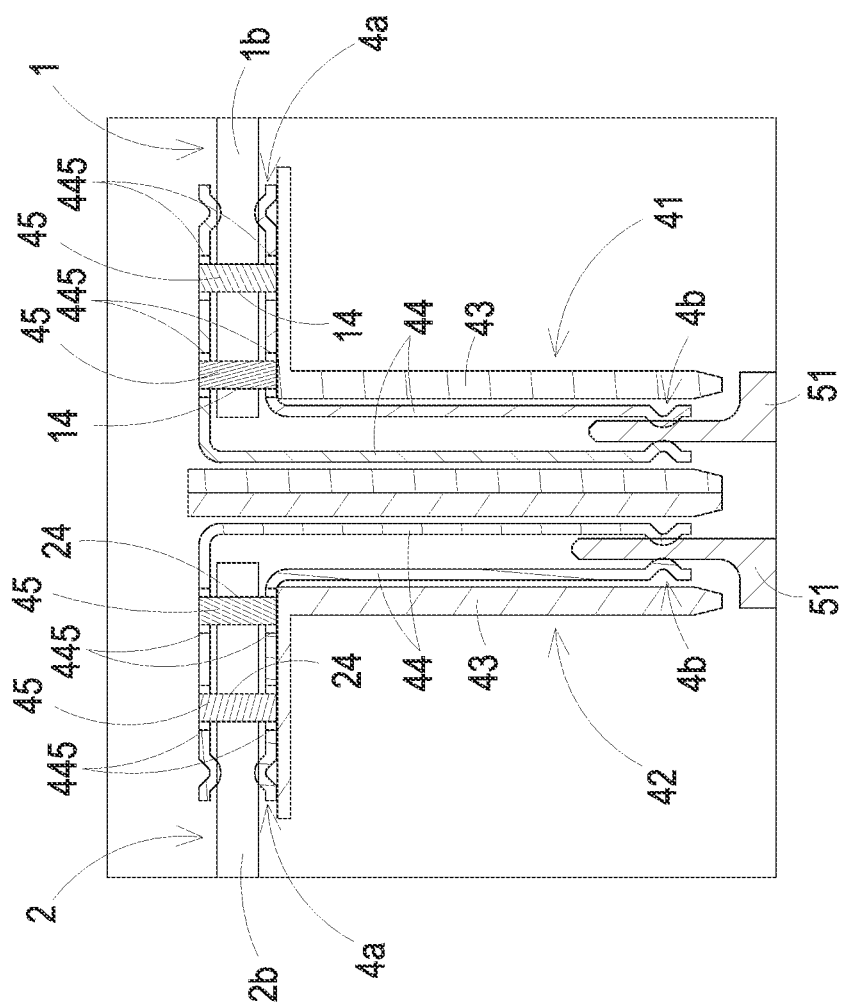
FIG. 10 is a partially enlarged cross-sectional view illustrating the bus bar assembly fixed to a rack bus bar of another embodiment of the present disclosure.

FIG. 10 is a partially enlarged cross-sectional view illustrating the bus bar assembly fixed to a rack bus bar of another embodiment of the present disclosure. Please refer to FIG. 10. In the present embodiment, the limiting elements 45 are fixedly mounted in the second limiting openings 14 of the first linking bus bar 1 and the second limiting openings 24 of the second linking bus bar 2, respectively. The areas of the first limiting openings 445 of the two conductors 44 are greater than the cross-sectional area of the limiting element 45, respectively, so that the limiting elements 45 are movably disposed in the corresponding one of the first limiting openings 445 of the two conductors 44, respectively. Due to the arrangement of the limiting elements 45, the first limiting openings 445, the second limiting openings 14 and the second limiting openings 24, the slidable distance of the first linking bus bar 1 and the second linking bus bar 2 are limited, so as to prevent the first linking bus bar 1 and the second linking bus bar 2 from being detached or poor contacting.

Figure 11:
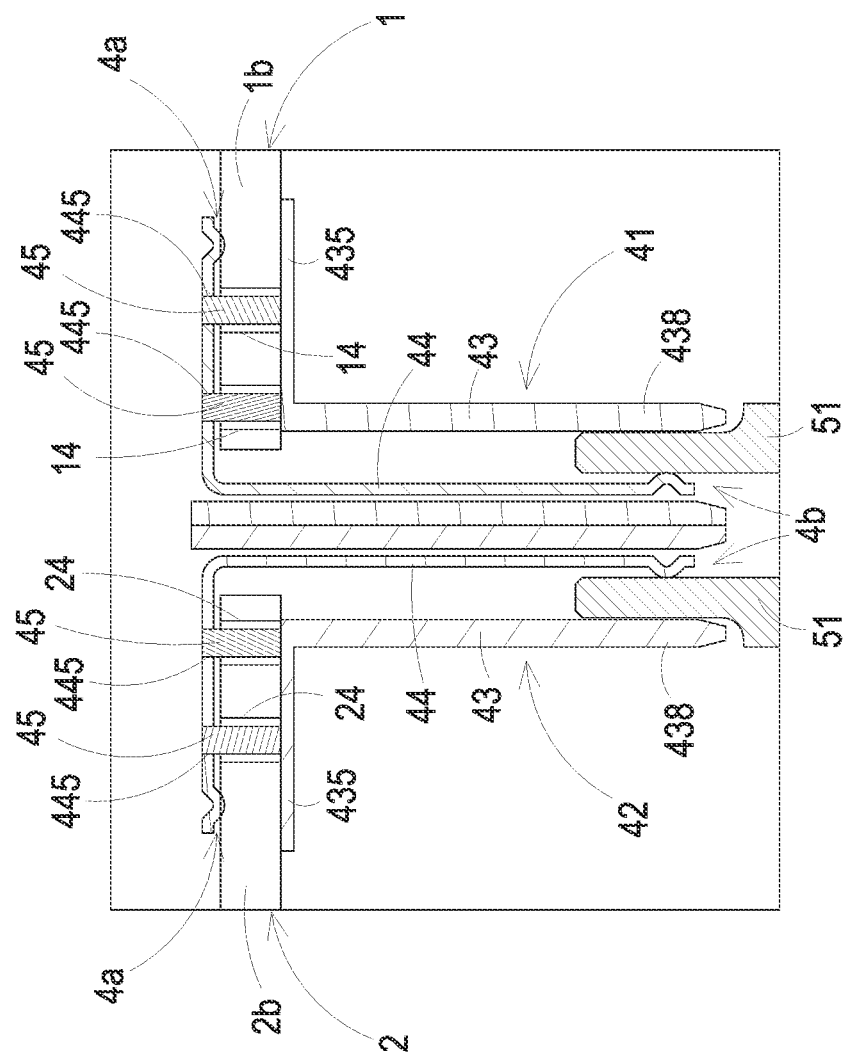
FIG. 11 is a partially enlarged cross-sectional view illustrating the bus bar assembly fixed to a rack bus bar of another embodiment of the present disclosure.

FIG. 11 is a partially enlarged cross-sectional view illustrating the bus bar assembly fixed to a rack bus bar of another embodiment of the present disclosure. Please refer to FIG. 11. In the present embodiment, each of the first connection module 41 and the second connection module 42 includes a single conductor 44, but not limited thereto. Each of the bus bar adapters 4a of the first connection module 41 and the second connection module 42 is formed by the conductor 44 and the first extension part 435 of the housing 43. The first output terminal 1b of the first linking bus bar 1 is blindly plugged into the bus bar adapter 4a of the first connection module 41, and the first output terminal 1b of the first linking bus bar 1 is slidably clipped between the conductor 44 and the first extension part 435 of the housing 43. Meanwhile, the conductor 44 is electrically coupled with the first output terminal 1b of the first linking bus bar 1. The second output terminal 2b of the second linking bus bar 2 is blindly plugged into the bus bar adapter 4a of the second connection module 42, and the second output terminal 2b of the second linking bus bar 2 is slidably clipped between the conductor 44 and the first extension part 435 of the housing 43. Meanwhile, the conductor 44 is electrically coupled with the second output terminal 2b of the second linking bus bar 2. The two connection terminals 51 of the rack bus bar 5 are blindly plugged into the rack adapters 4b of the first connection module 41 and the second connection module 42, respectively, and the two connection terminals 51 of the rack bus bar 5 are slidably clipped between the second end 44b of the conductor 44 and the fourth extension part 438 of the housing 43, respectively. Meanwhile, the conductor 44 is electrically coupled with the corresponding connection terminal 51 of the rack bus bar 5.

Figure 12:
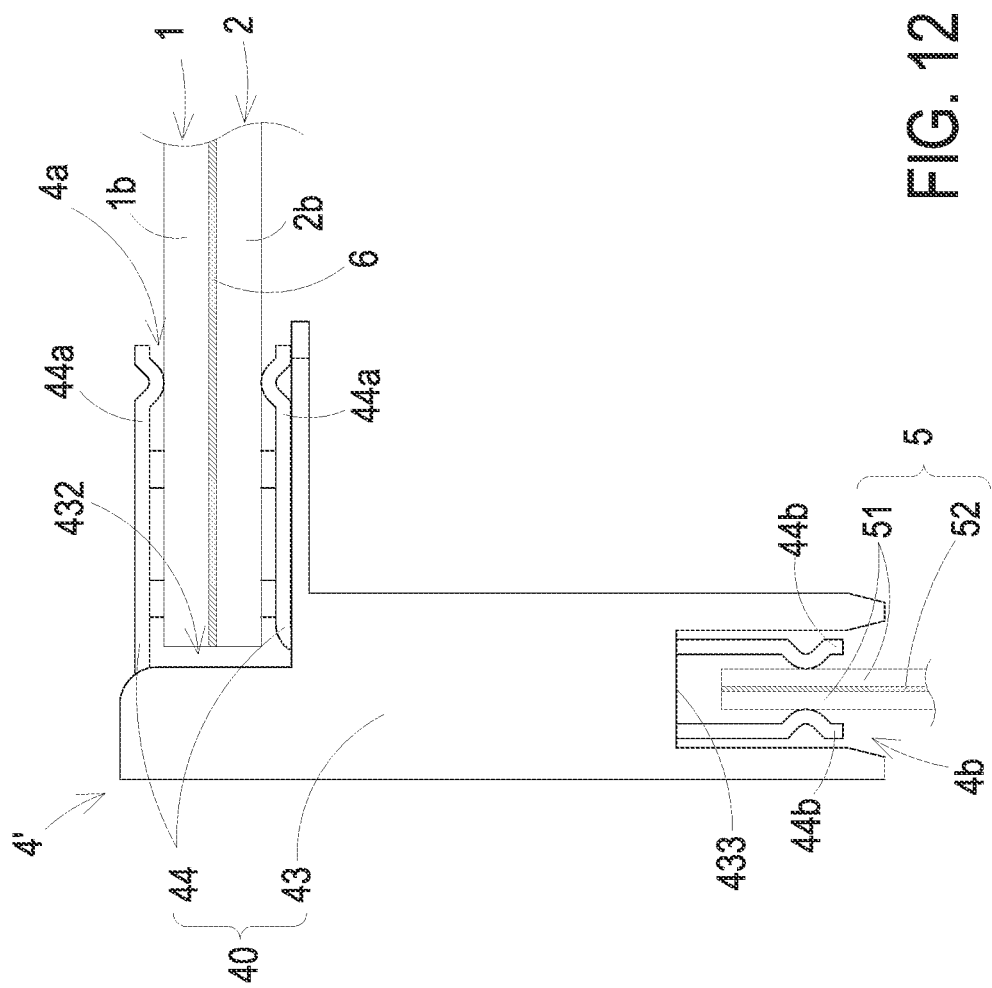
FIG. 12 is a partially enlarged top view illustrating the bus bar assembly fixed to a rack bus bar of the other embodiment of the present disclosure.

FIG. 12 is a partially enlarged top view illustrating the bus bar assembly fixed to a rack bus bar of the other embodiment of the present disclosure. In the present embodiment, the floating connector 4' includes a single connection module 40. The connection module 40 includes a housing 43 and two conductors 44. The housing 43 of the present embodiment is the same as the housing 43 of the above-mentioned embodiments, and would not be repeatedly described hereinafter. In the present embodiment, at least a part of the two conductors 44 are disposed inside the housing 43, and each of the two conductors 44 include a first end 44a and a second end 44b. The two first ends 44a of the two conductors 44 are positionally corresponding to the bus bar opening 432, so as to form the bus bar adapter 4a. The two second end 44b of the two conductors 44 are positionally corresponding to the rack opening 433, so as to form the rack adapter 4b. In the present embodiment, the first output terminal 1b of the first linking bus bar 1 is disposed adjacent to a side of the second output terminal 2b of the second linking bus bar 2. The insulation element 6 is extended and disposed between the first output terminal 1b and the second output terminal 2b, so that the first linking bus bar 1 is insulated from the second linking bus bar 2. When the first output terminal 1b and the second output terminal 2b are blindly plugged into the bus bar adapter 4a of the connection module 40, one of the first ends 44a of the conductors 44 is in contact with the first output terminal 1b of the first linking bus bar 1, the other of the first ends 44a of the conductors 44 is in contact with the second output terminal 2b of the second linking bus bar 2, so that the first output terminal 1b and the second output terminal 2b are slidably clipped between the two first ends 44a of the two conductors 44. Meanwhile, the first output terminal 1b and the second output terminal 2b are electrically coupled with the two conductors 44. In the present embodiment, one of the connection terminals 51 of the rack bus bar 5 is disposed adjacent to a slide of the other of the connection terminals 51. The rack bus bar 5 includes an insulation element 52. The insulation element 52 is disposed between the two connection terminals 51, so that the two connection terminals 51 are insulated from each other. When the two connection terminals 51 are blindly plugged into the rack adapter 4b of the connection module 40, one of the second ends 44b of the conductors 44 is in contact with one of the connection terminals 51, the other of the second ends 44b of the conductors 44 is in contact with the other of the connection terminals 51, so that the two connection terminals 51 of the rack bus bar 5 are slidably disposed between the two second ends 44b of the two conductors 44. Meanwhile, the conductors 44 are electrically coupled with the rack bus bar 5. Since the first linking bus bar 1, the second linking bus bar 2 and the rack bus bar 5 are slidably plugged into the floating connector 4', the advantages of blind-mating assembly without screws, reducing the stress between devices and reducing manual assembly errors are achieved.

From the above descriptions, the present disclosure provides a bus bar assembly including a floating connector. By employing the floating connector, screwless blind-mating assembly and slidably plugging in three directions are achieved, which can reduce the stress between the devices and reduce manual assembly errors. Since the protrusions of the conductors are used to clip the first output terminal of the first linking bus bar, the second output terminal of the second linking bus bar and the connection terminals of the rack bus bar, the risk of component detachment is prevented. Since the conductor is bent to have a plurality of segments, the plug direction of the bus bar adapter and the plug direction of the rack adapter are non-coplanar, and the advantage of transferring the direction of connecting the bus bar adapter to the rack adapter is achieved. Since the housing of the floating connector includes a plurality of extension parts, the conductor is prevented from being excessively deformed or broken during the assembly process. Due to the arrangement of the limiting elements, the first limiting openings and the second limiting openings, the slidable distance of the first linking bus bar and the second linking bus bar are limited, and the advantages of preventing the first linking bus bar and the second linking bus bar from being detached or poor contacting are achieved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bus bar assembly, comprises:
   a first linking bus bar comprising at least one first input terminal and a first output terminal;
   a second linking bus bar disposed corresponding to and insulated from the first linking bus bar, and comprising at least one second input terminal and a second output terminal;
   a plurality of connectors electrically coupled to the at least one first input terminal of the first linking bus bar and the at least one second input terminal of the second linking bus bar, respectively; and
   a floating connector comprising at least one first connection module and at least one second connection module, wherein each of the at least one first connection module and the at least one second connection module comprises a bus bar adapter and a rack adapter, wherein the first output terminal of the first linking bus bar is slidably and blindly plugged into the bus bar adapter of the at least one first connection module, the second output terminal of the second linking bus bar is slidably and blindly plugged into the bus bar adapter of the at least one second connection module, and the rack adapter is configured for allowing two connection terminals of a rack bus bar to be slidably and blindly plugged therein,
   wherein the first linking bus bar and the second linking bus bar are slid along a first direction inside the bus bar adapters of the at least one first connection module and the at least one second connection module, respectively, wherein the two connection terminals of the rack bus bar are slid along a second direction or a third direction inside the rack adapters of the at least one first connection module and the at least one second connection module, respectively, wherein the first direction, the second direction and the third direction are perpendicular to each other.

2. The bus bar assembly according to claim 1, wherein each of the at least one first connection module and the at least one second connection module of the floating connector comprises a housing and at least one conductor, wherein the housing comprises a main body, a bus bar opening, a rack opening and a channel, wherein the channel is in communication between the bus bar opening and the rack opening, and runs through the main body, wherein at least a part of the at least one conductor is accommodated in the channel of the housing, wherein the at least one conductor comprises a first end and a second end, wherein the first end of the at least one conductor is disposed corresponding to the bus bar opening, so as to form the bus bar adapter, wherein the second end of the at least one conductor is disposed corresponding to the rack opening, so as to form the rack adapter.

3. The bus bar assembly according to claim 2, wherein the first end and the second end of the at least one conductor have at least one protrusion, respectively, wherein when the first output terminal of the first linking bus bar is blindly plugged into the bus bar adapter of the at least one first connection module, the at least one protrusion of the first end of the at least one conductor of the at least one first connection module contacts against the first output terminal, wherein when the second output terminal of the second linking bus bar is blindly plugged into the bus bar adapter of the at least one second connection module, the at least one protrusion of the first end of the at least one conductor of the at least one second connection module contacts against the second output terminal, wherein when the two connection terminals of the rack bus bar are blindly plugged into the rack adapter, the at least one protrusion of the second end of the at least one conductor contacts against the two connection terminals of the rack bus bar.

4. The bus bar assembly according to claim 2, wherein the at least one conductor comprises a first segment and a second segment, wherein the first segment is in connection with the second segment, and is bent from the second segment by a first angle.

5. The bus bar assembly according to claim 4, wherein the first end of the at least one conductor is a free end of the first segment, and the first segment is disposed outside the bus bar opening of the housing, wherein the extension direction of a plane where the first segment is located is parallel to the extension direction of a plane where the bus bar opening is located, wherein the second end of the at least one conductor is a free end of the second segment, the second end is protruded outside the channel from the rack opening of the housing.

6. The bus bar assembly according to claim 5, wherein the housing comprises a first extension part, a second extension part, a third extension part and a fourth extension part, wherein the first extension part is extended from the main body toward a planar extension direction where the bus bar opening is located, wherein the first extension part is disposed corresponding to the first segment, wherein the second extension part is extended from the bus bar opening toward an extended direction perpendicular to a plane where the bus bar opening is located, wherein the first extension part and the second extension part are disposed on two opposite sides of the bus bar opening, and are spaced apart from each other by an interval, wherein the second extension part has a first part, a second part and a third part, wherein the first part, the second part and the third part are in connection with the main body, and are in connection adjacent to each other, wherein the second part and the third part are in connection with two opposite sides of the first part, respectively, wherein the second extension part is disposed corresponding to a part of the second segment of the at least one conductor and a bent portion of the second segment and the first segment, wherein the third extension part and the fourth extension part are disposed on two opposite sides of the rack opening, are extended from the main body toward a direction away from the rack opening, respectively, and are corresponding to each other, wherein a notch is formed between the third extension part and the fourth extension part, and the second end of the at least one conductor is disposed in the notch.

7. The bus bar assembly according to claim 5, wherein each of the at least one first connection module and the at least one second connection module comprises at least one limiting element, wherein the at least one conductor of the at least one first connection module and the at least one second connection module comprises at least one first limiting opening, wherein the at least one first limiting opening runs through the first segment of the at least one conductor, wherein each of the first output terminal of the first linking bus bar and the second output terminal of the second linking bus bar comprises at least one second limiting opening, wherein the at least one limiting element penetrates through the at least one first limiting opening and the at least one second limiting opening.

8. The bus bar assembly according to claim 7, wherein the at least one limiting element is fixedly mounted in one of the at least one first limiting opening and the at least one second limiting opening, and another one of the at least one first limiting opening and the at least one second limiting opening has an area which is greater than a cross-sectional area of the at least one limiting element, so that the at least one limiting element is movably disposed in the at least one first limiting opening or the at least one second limiting opening.

9. The bus bar assembly according to claim 2, wherein the at least one conductor comprises a first segment, a second segment and a third segment, wherein the first segment and the second segment are in connection with two adjacent sides of the third segment, wherein the first segment is bent from the third segment by a second angle, and the second segment is bent from the third segment by a third angle.

10. A floating connector, configured to transmit electric power received by at least one linking bus bar of a bus bar assembly to a rack bus bar, wherein the at least one linking bus bar comprises an output terminal, and the rack bus bar comprises at least one connection terminal, wherein the floating connector comprises:
at least one connection module configured to be electrically coupled between the at least one linking bus bar and the rack bus bar, and comprising a bus bar adapter and a rack adapter;
wherein the output terminal of the at least one linking bus bar is slidably and blindly plugged into the bus bar adapter of the at least one connection module, wherein the rack adapter is configured for allowing the at least one connection terminal of the rack bus bar to be slidably and blindly plugged therein,
wherein the bus bar adapter is configured to allow the at least one linking bus bar to slide along a first direction, wherein the rack adapter is configured to allow the at least one connection terminal of the rack bus bar to slide along a second direction or a third direction, wherein the first direction, the second direction and the third direction are perpendicular to each other.

11. The floating connector according to claim 10, wherein the at least one connection module of the floating connector comprises a housing and at least one conductor, wherein the housing comprises a main body, a bus bar opening, a rack opening and a channel, wherein the channel is in communication between the bus bar opening and the rack opening, and runs through the main body, wherein at least a part of the at least one conductor is accommodated in the channel of the housing, wherein the at least one conductor comprises a first end and a second end, wherein the first end of the at least one conductor is disposed corresponding to the bus bar opening, so as to form the bus bar adapter, wherein the second end of the at least one conductor is disposed corresponding to the rack opening, so as to form the rack adapter.

12. The floating connector according to claim 11, wherein the first end and the second end of the at least one conductor have at least one protrusion, respectively, wherein when the at least one linking bus bar is blindly plugged into the bus bar adapter of the at least one connection module, the at least one protrusion of the first end of the at least one conductor of the at least one connection module contacts against the output terminal, wherein when the at least one connection terminal of the rack bus bar is blindly plugged into the rack adapter, the at least one protrusion of the second end of the at least one conductor contacts against the at least one connection terminal of the rack bus bar.

13. The floating connector according to claim 11, wherein the at least one conductor comprises a first segment and a second segment, wherein the first segment is in connection with the second segment, and is bent from the second segment by a first angle.

14. The floating connector according to claim 13, wherein the first end of the at least one conductor is a free end of the first segment, and the first segment is disposed outside the bus bar opening of the housing, wherein the extension direction of a plane where the first segment is located is parallel to the extension direction of a plane where the bus bar opening is located, wherein the second end of the at least one conductor is a free end of the second segment, the second end is protruded outside the channel from the rack opening of the housing.

15. The floating connector according to claim 14, wherein the housing comprises a first extension part and a second extension part, wherein the first extension part is extended from the main body toward a planar extension direction where the bus bar opening is located, wherein the first extension part is disposed corresponding to the first segment, wherein the second extension part is extended from the bus bar opening toward an extended direction perpendicular to a plane where the bus bar opening is located, wherein the first extension part and the second extension part are disposed on two opposite sides of the bus bar opening, and are spaced apart from each other by an interval, wherein the second extension part has a first part, a second part and a third part, wherein the first part, the second part and the third part are in connection with the main body, and are in connection adjacent to each other, wherein the second part and the third part are in connection with two opposite sides of the first part, respectively, wherein the second extension part is disposed corresponding to a part of the second segment of the at least one conductor and a bent portion of the second segment and the first segment.

16. The floating connector according to claim 14, wherein the housing comprises a third extension part and a fourth extension part, wherein the third extension part and the fourth extension part are disposed on two opposite sides of the rack opening, are extended from the main body toward a direction away from the rack opening, respectively, and are corresponding to each other, wherein a notch is formed between the third extension part and the fourth extension part, and the second end of the at least one conductor is disposed in the notch.

17. The floating connector according to claim 14, wherein the at least one connection module comprises at least one limiting element, wherein the at least one conductor comprises at least one first limiting opening, wherein the at least one first limiting opening runs through the first segment of the at least one conductor, wherein the output terminal of the at least one linking bus bar comprises at least one second limiting opening, wherein the at least one limiting element penetrates through the at least one first limiting opening and the at least one second limiting opening.

18. The floating connector according to claim 17, wherein the at least one limiting element is fixedly mounted in one of the at least one first limiting opening and the at least one second limiting opening, and another one of the at least one first limiting opening and the at least one second limiting opening has an area which is greater than a cross-sectional area of the at least one limiting element, so that the at least one limiting element is movably disposed in the at least one first limiting opening or the at least one second limiting opening.

19. The floating connector according to claim 11, wherein the at least one conductor comprises a first segment, a second segment and a third segment, wherein the first segment and the second segment are in connection with two adjacent sides of the third segment, wherein the first segment is bent from the third segment by a second angle, and the second segment is bent from the third segment by a third angle.

* * * * *